United States Patent [19]

Yutani et al.

[11] Patent Number: 5,754,164

[45] Date of Patent: May 19, 1998

[54] OUTLINE FONT EXPANDING METHOD AND OUTLINE FONT EXPANDING DEVICE

[75] Inventors: Yoshikazu Yutani; Toshiya Yamauchi; Katsumi Murai, all of Kanagawa, Japan

[73] Assignee: Fujitsu Limited, Kawasaki, Japan

[21] Appl. No.: 399,579

[22] Filed: Mar. 7, 1995

[30] Foreign Application Priority Data

Jun. 29, 1994 [JP] Japan ................. 6-148253

[51] Int. Cl.⁶ .................................. G06F 15/62
[52] U.S. Cl. .................................. 345/143; 395/101
[58] Field of Search .................. 345/113, 141, 345/142, 144; 395/117, 101, 133, 143

[56] References Cited

U.S. PATENT DOCUMENTS

| | | | |
|---|---|---|---|
| 5,276,790 | 1/1994 | Lo et al. | 395/142 |
| 5,295,240 | 3/1994 | Kajimoto | 395/151 |
| 5,299,299 | 3/1994 | Ohuchi | 395/126 |
| 5,301,267 | 4/1994 | Hassett et al. | 395/150 |
| 5,305,433 | 4/1994 | Ohno | 395/150 |
| 5,355,449 | 10/1994 | Lung et al. | 395/150 |
| 5,355,451 | 10/1994 | Nonaka | 395/166 |
| 5,428,728 | 6/1995 | Lung et al. | 395/150 |
| 5,438,656 | 8/1995 | Valdés et al. | 395/143 |
| 5,504,591 | 4/1996 | Dujari | 358/426 |
| 5,526,476 | 6/1996 | Motokado et al. | 395/151 |
| 5,553,219 | 9/1996 | Kurashige | 395/150 |

*Primary Examiner*—Raymond J. Bayerl
*Assistant Examiner*—Steven P. Sax
*Attorney, Agent, or Firm*—Staas & Halsey

[57] ABSTRACT

The present invention relates to an outline font expanding method and an outline font expanding device each of which can reproduce faithfully the line width of an original outline font. The coordinate system for vector data is defined on the boundaries between dots to create an outline font on the boundaries. The number of dots in the main scanning direction is calculated as a unit change when the outline font is moved by one dot in the secondary scanning direction. A value obtained by dividing the unit change by 2 is added to the coordinate in the main scanning direction of the outline font, while the scanning line is moved dot by dot in the main scanning direction, the intersection of the scanning line and the outline font is obtained at each move position. Thus, the filling range over the scanning line is defined in the main scanning direction. This invention is applicable to a method which fills the inside of an outline font drawn, based on vector data and then forms a dot pattern of a character, symbol, graph, or the like.

22 Claims, 38 Drawing Sheets

FIG.6

| POINT | OFFSET | X-COORDINATE | Y-COORDINATE |
|---|---|---|---|
| A | 0 | 0 | 1 |
| B | 1 | 10 | 1 |
| C | 2 | 10 | 3 |
| D | 3 | 9 | 2 |
| E | 4 | 6 | 2 |
| F | 5 | 6 | 9 |
| G | 6 | 8 | 10 |
| H | 7 | 2 | 10 |
| I | 8 | 4 | 9 |
| J | 9 | 4 | 2 |
| K | 10 | 1 | 2 |
| L | 11 | 0 | 3 |
| A | 12 | 0 | 1 |

FIG.7

| NUMBER | DIRECTION | START VECTOR OFFSET | END VECTOR OFFSET | CURRENT INTERSECTION (X) | UNIT CHANGE |
|---|---|---|---|---|---|
| 0 | DOWN | 1 | 2 | 10 | 0 |
| 1 | UP | 3 | 2 | 9.5 | 1 |
| 2 | DOWN | 4 | 6 | 6 | 0 |
| 3 | UP | 9 | 7 | 4 | 0 |
| 4 | DOWN | 10 | 11 | 0.5 | -1 |
| 5 | UP | 12 | 11 | 0 | 0 |

| NUMBER | DIRECTION | START VECTOR OFFSET | END VECTOR OFFSET | CURRENT INTERSECTION (X) | UNIT CHANGE |
|---|---|---|---|---|---|
| 0 | DOWN | 1 | 2 | 10 | 0 |
| 1 | UP | 3 | 2 | 9.5 | 1 |
| 2 | DOWN | 4 | 6 | 6 | 0 |
| 3 | UP | 9 | 7 | 4 | 0 |
| 4 | DOWN | 10 | 11 | 0.5 | -1 |
| 5 | UP | 12 | 11 | 0 | 0 |

| NUMBER | DIRECTION | START VECTOR OFFSET | END VECTOR OFFSET | CURRENT INTERSECTION (X) | UNIT CHANGE |
|---|---|---|---|---|---|
| 0 | DOWN | 2 | 2 | — | 0 |
| 1 | UP | 2 | 2 | — | 1 |
| 2 | DOWN | 4 | 6 | 6 | 0 |
| 3 | UP | 9 | 7 | 4 | 0 |
| 4 | DOWN | 11 | 11 | — | -1 |
| 5 | UP | 11 | 11 | — | 0 |

| NUMBER | DIRECTION | START VECTOR OFFSET | END VECTOR OFFSET | CURRENT INTERSECTION (X) | UNIT CHANGE |
|---|---|---|---|---|---|
| 0 | DOWN | 2 | 2 | — | 0 |
| 1 | UP | 2 | 2 | — | 1 |
| 2 | DOWN | 4 | 6 | 6 | 0 |
| 3 | UP | 9 | 7 | 4 | 0 |
| 4 | DOWN | 11 | 11 | — | −1 |
| 5 | UP | 11 | 11 | — | 0 |

F I G. 14
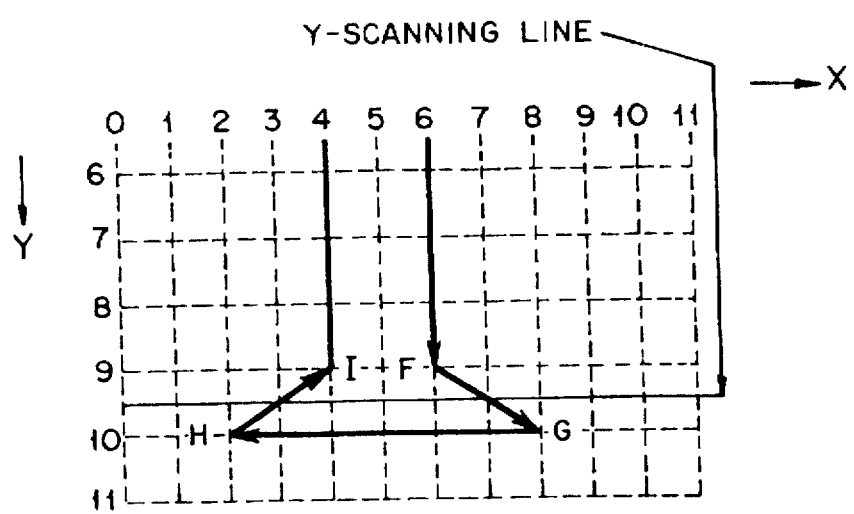

| NUMBER | DIRECTION | START VECTOR OFFSET | END VECTOR OFFSET | CURRENT INTERSECTION (Y) | UNIT CHANGE |
|---|---|---|---|---|---|
| 0 | RIGHT | 0 | 1 | 1 | 0 |
| 1 | LEFT | 4 | 2 | 2 | 0 |
| 2 | RIGHT | 5 | 6 | 9.25 | 0.5 |
| 3 | LEFT | 7 | 6 | 10 | 0 |
| 4 | RIGHT | 7 | 8 | 9.75 | -0.5 |
| 5 | LEFT | 11 | 9 | 2.5 | -1 |

F I G. 21
| NUMBER | DIRECTION | START VECTOR OFFSET | END VECTOR OFFSET | CURRENT INTERSECTION (Y) | UNIT CHANGE |
|---|---|---|---|---|---|
| 0 | RIGHT | 0 | 1 | 1 | 0 |
| 1 | LEFT | 4 | 2 | 2 | 0 |
| 2 | RIGHT | 5 | 6 | 9.25 | 0.5 |
| 3 | LEFT | 7 | 6 | 10 | 0 |
| 4 | RIGHT | 7 | 8 | 9.75 | -0.5 |
| 5 | LEFT | 11 | 9 | 2 | 0 |
F I G. 22
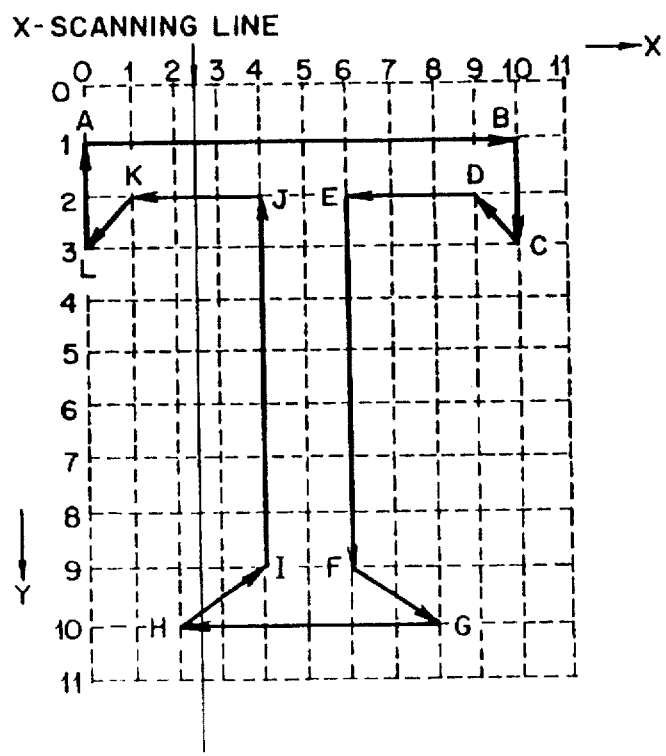

F I G. 24
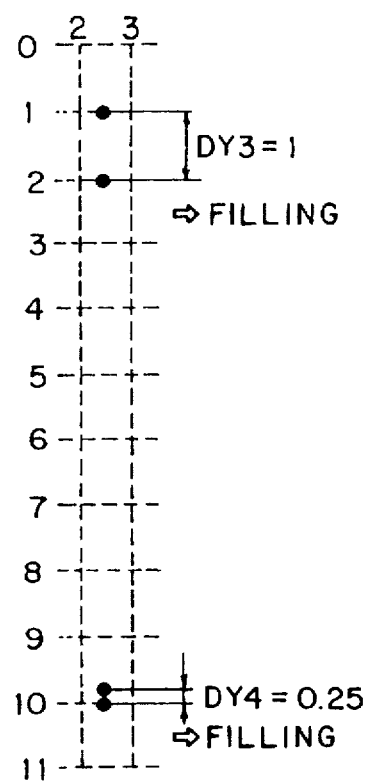

F I G. 26
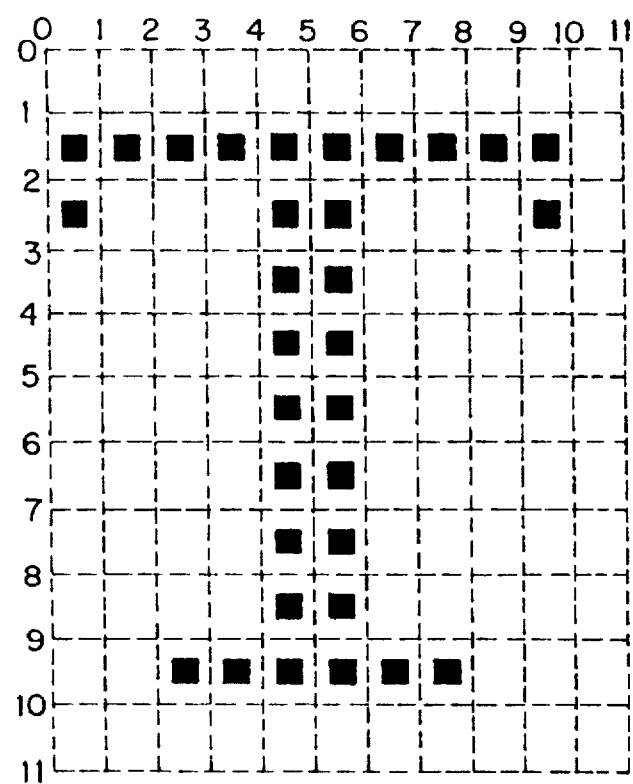

FIG. 44

| POINT | OFFSET | X-COORDINATE | Y-COORDINATE |
|-------|--------|--------------|--------------|
| A | 0 | 0 | 1 |
| B | 1 | 10 | 1 |
| C | 2 | 10 | 3 |
| D | 3 | 9 | 2 |
| E | 4 | 6 | 2 |
| F | 5 | 6 | 9 |
| G | 6 | 8 | 10 |
| H | 7 | 2 | 10 |
| I | 8 | 4 | 9 |
| J | 9 | 4 | 2 |
| K | 10 | 1 | 2 |
| L | 11 | 0 | 3 |
| A | 12 | 0 | 1 |

| NUMBER | DIRECTION | START VECTOR OFFSET | END VECTOR OFFSET | CURRENT INTERSECTION (X) | UNIT CHANGE |
|--------|-----------|---------------------|-------------------|--------------------------|-------------|
| 0 | DOWN | 1 | 2 | 10 | 0 |
| 1 | UP | 3 | 2 | 9 | 1 |
| 2 | DOWN | 4 | 6 | 6 | 0 |
| 3 | UP | 9 | 7 | 4 | 0 |
| 4 | DOWN | 10 | 11 | 1 | −1 |
| 5 | UP | 12 | 11 | 0 | 0 |

| NUMBER | DIRECTION | START VECTOR OFFSET | END VECTOR OFFSET | CURRENT INTERSECTION (X) | UNIT CHANGE |
|---|---|---|---|---|---|
| 0 | DOWN | 1 | 2 | 10 | 0 |
| 1 | UP | 3 | 2 | 9 | 1 |
| 2 | DOWN | 4 | 6 | 6 | 0 |
| 3 | UP | 9 | 7 | 4 | 0 |
| 4 | DOWN | 10 | 11 | 1 | −1 |
| 5 | UP | 12 | 11 | 0 | 0 |

| NUMBER | DIRECTION | START VECTOR OFFSET | END VECTOR OFFSET | CURRENT INTERSECTION (X) | UNIT CHANGE |
|---|---|---|---|---|---|
| 0 | DOWN | 2 | 2 | — | 0 |
| 1 | UP | 2 | 2 | — | -1 |
| 2 | DOWN | 4 | 6 | 6 | 0 |
| 3 | UP | 9 | 7 | 4 | 0 |
| 4 | DOWN | 11 | 11 | — | 1 |
| 5 | UP | 11 | 11 | — | 0 |

F I G. 53
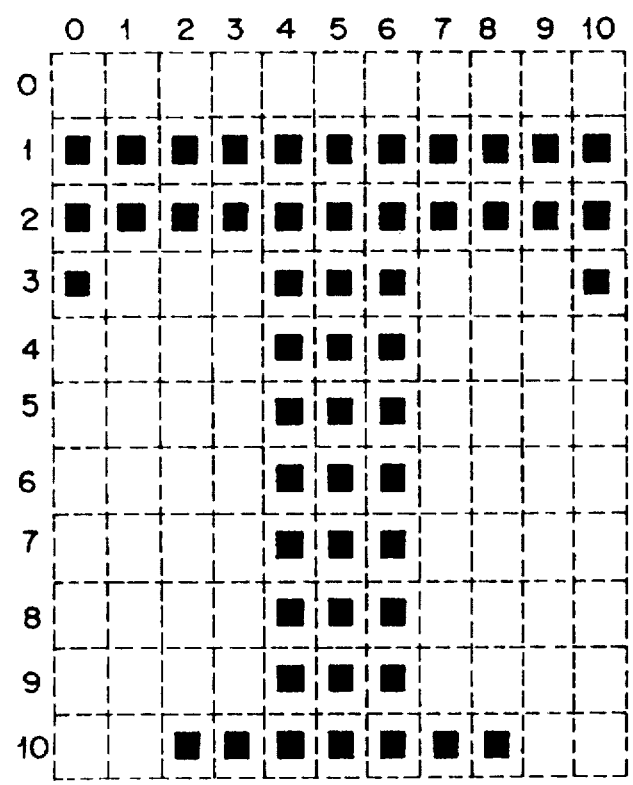

OUTLINE FONT EXPANDING METHOD AND OUTLINE FONT EXPANDING DEVICE

BACKGROUND OF THE INVENTION

1) Field of the Invention

The present invention relates to an outline font expanding method and an outline font expanding device each which fills the inside of an outline font drawn, based on vector data, to create a dot pattern such as letters, symbols, and graphics.

2) Description of the Related Art

Generally, in the outline font expansion, contour lines (outlines) are drawn sequentially in a memory which includes prescribed regions used to create letters, symbols, graphics, etc., based on vector data representing a letter, symbol, or graphic to draw an outline font.

Thereafter, the memory is scanned every raster line to search for an outline and then the inside of the searched outline is filled. The filling process is repeated every raster line. When the filling process is completed, the resultant dot pattern (a set of dots) is transferred to and sequentially stored into a memory for printing with a printer and a memory for representing on a display.

The procedure of filling the inside of an outline font created by a prior-art outline font expansion will be described below according to the flowcharts (steps S1 to S9) shown in FIG. 42 and with reference to FIGS. 43 to 53.

(1) It is decided whether a letter, symbol, or graphic to be expanded is enlarged or reduced (step S1). Where enlargement or reduction is needed (YES decision), the outline data (vector data) to be expanded is enlarged or reduced to a desired output dot size (step S2).

Where enlargement or reduction is not needed (NO decision in the step S1), or after enlargement or reduction is performed in the step S2, a filling table used for characters, symbols, and graphics to be expanded is prepared as follows (step S3):

For example, the case where a filling process is applied to the outline font (Roman alphabet "T") shown in FIG. 43 will be described here.

Referring to FIG. 43, the right direction represents the positive direction of the X-axis and the downward direction represents the positive direction of the Y-axis. The rectangles defined by dotted lines represent dots. In FIG. 43, the topmost and leftmost dot is the origin (0, 0) in the X-Y coordinate system. The coordinates of an outline font are defined on dots. The vector data of the outline font shown in FIG. 43 are listed as the vector table shown in FIG. 44.

The X-coordinates and Y-coordinates of 12 apexes A to L of the outline font shown in FIG. 43 are set in the vector table shown in FIG. 44. The offsets 0 to 12 are set to the apexes A to L, respectively. The apex nearest to the origin is selected as a starting point (end point). An offset to each apex is set along the outline from the apex A. Since the offset "12" has its starting point matching the end point at the apex A or the end point of the offset "0", the filling range of the outline font is formed as a closed area.

(2) In order to prepare a filling table, all vector data to be expanded are first retrieved to obtain the vector table for an outline font to be expanded, for example, as shown in FIG. 44. Then outline font forming vectors are divided into continuous upward vector row (in the negative direction of the Y-axis) and continuous downward vector row (in the positive direction of the Y-axis), based on the vector table. Those directivities are set in the filling table shown in FIG. 45 (refer to items of "up" and "down" in FIG. 45). In this case, the vector component in the horizontal direction (X-axis direction) is neglected.

In concrete terms, FIG. 43 shows 6 vector rows: downward vector row I directing from the point B to the point C, upward vector row II directing from the point C to the point D, downward vector row III reaching the point G via the point E and the point F, upward vector row IV reaching the point J via the point H and the point I, upward vector row V directing from the point K to the point L, and upward vector row VI directing from the point L to the point A. In the filling table shown in FIG. 45, the vector rows I to VI correspond to number "0" top "5", respectively.

(3) The offset of the vector with the minimum Y-coordinate of the vector row is retrieved from the vector table and is set as a start vector in the filling table. Likewise, the offset of the vector with the maximum Y-coordinate of each vector row is retrieved from the vector table and is set as an end vector in the filling table. The X-coordinate of the start vector set above is retrieved from the vector table and is set as the initial value of the current intersection (X) in the filling table.

(4) As to the start vector of each vector row set in the filling table, when the start vector is moved by one dot in the positive direction of the Y-axis, the change (the number of dots) on the X-coordinate is calculated, based on data in the vector table, and then is set as a unit change in the filling table. For example, the start vectors of the vector rows I, III, IV, and VI, shown in FIG. 43, in parallel to the Y-axis, do not produce any change in the X-axis direction. Hence the unit change is 0. The start vector of the vector row II moved by one dot in the positive direction of the Y-axis produces a change by one dot in the positive direction of the X-axis, thus causing the unit change of +1. When the start vector of the vector row V moves by one dot in the positive direction of the Y-axis, it changes by one dot in the negative direction of the X-axis. Hence the unit change is −1.

(5) As shown in FIG. 45, the filling table is prepared by performing the steps (2) to (4) described above. With reference to the filling table, the intersection of each vector row and the Y-scanning line is calculated by performing the main scanning in the positive direction of the X-axis and the secondary scanning in the positive direction of the Y-axis. The steps similar to the following items (6) to (8) are repeated till it is decided that all Y-scanning line have been processed by a target output Y-coordinate size (vertical size), or in the step S4.

(6) It is decided whether a process has been completed to all Y-scanning lines (step S4). At the same time, the filling table, as shown in FIGS. 46 and 48, is updated by moving the Y-scanning line dot by dot from the Y-coordinate (0) in the positive direction of the Y-axis and then calculating all the intersections of the current Y-scanning line and the outline font, based on data on the filling table (step S5). The calculated intersection corresponds to the current intersection itself in the filling table.

As to the vector row intersecting the Y-scanning line, the filling table is updated by adding once the unit change to the current intersection (X) every time the Y-scanning line is moved by one dot. The intersection of the Y-scanning line and the outline font can be obtained only by referencing the current intersection (X) of the vector row intersecting the Y-scanning line with the filling table.

For example, when the Y-scanning line is scanned from the Y-coordinate (0) to the Y-coordinate (1), it intersects the vector rows I and VI. Then the intersection has the X-coordinates (10) and (0) (refer to the shaded portion in FIG. 47 and FIG. 49).

(7) All the intersections obtained in the step S5 are sorted (step S6). Then the dots between the intersections sorted are reciprocally filled and then are transferred to the memory for the current Y-coordinate (step S7). For example, the intersections calculated as shown in FIG. 49, each which corresponds to the position shown in FIG. 48, are filled as shown in FIG. 50. The dots between the two intersections, shown in FIGS. 48 and 49, is subjected to the filling operation. Where there are many intersections (for example, four intersections at the Y-coordinate (3)), the sorting process in the step S6 is needed to decide what is the range between intersections to be filled.

(8) It is decided whether the vector intersecting the current Y-scanning line intersects the next Y-scanning line moved by one dot in the positive direction of the Y-axis. If it is not to be intersected (the case where the vector offset is updated or the YES decision in the step S8), the offset of the start vector of the current vector row is changed into the next vector. The unit change in the X-axis direction of the resultant vector is calculated to set a filling table. The X-coordinate of the updated start vector is set to the current intersection and then updated (step S9). Then the flow goes to the step S4.

As shown in FIG. 45, when a filling table is prepared in the step S3, the unit change and the current intersection of all the vector rows are set on the filling table. Hence, the updating process described above is not needed in the step S9. The updating process can be performed only by switching the vector row used to refer the current intersection to the next vector row on the filling table.

Where the vector intersecting the current Y-scanning line intersects the next Y-scanning line moved by one bit in the positive direction of the Y-axis (where the vector offset is not updated or the NO decision in the step S8), the flow goes to the step S4 without any change.

When the Y-scanning line is positioned at the Y-coordinate 4, as shown in FIG. 52, the filling table is updated as shown in FIG. 51.

According to the filling process described above, the outline font shown in FIG. 43, for example, can be formed as the dot pattern shown in FIG. 53.

However, where the conventional outline font expanding means defines the coordinate of an outline font on dots, for example, the line width (DY1) of two dots formed between the points A and B shown in FIG. 54 is subjected to the filling process, the actual outline font with the line width (DY2) of three dots as a result of an increment of one dot is formed as shown in FIG. 55. Hence the original line width of the outline font cannot be reproduced faithfully.

Particularly, when the outline font with a blank of one dot in width in the middle portion, shown in FIG. 56, is subjected to the conventional filling process, the blank is filled as shown in FIG. 57.

Particularly, such a phenomenon degrades significantly the quality of the dot patterns, resulting in low resolution.

SUMMARY OF THE INVENTION

The present invention is made to overcome the above mentioned problems. An object of the present invention is to provide an outline font expanding method that can reproduce faithfully the original line width of an outline font, thus realizing a dot pattern with improved quality.

Another object of the invention is to provide an outline font expanding device that can reproduce faithfully the original line width of an outline font, thus realizing a dot pattern with improved quality.

In order to achieve the above objects, according to the present invention, the outline font expanding method which includes the steps of drawing sequentially a contour line to form an outline font, based on vector data, and then filling the inside of the outline font to form a dot pattern, includes the steps of defining a coordinate system of the vector data on boundaries between dots and then creating the outline font on the boundaries; calculating the number of dots as a unit change moved in the main scanning direction when the outline font is moved by one dot in the secondary scanning direction; adding a value obtained by dividing the unit change by 2 to the coordinate in the main scanning direction of the outline font; moving the scanning line dot by dot in the main scanning direction while obtaining an intersection of the scanning line and the outline font at each move position; and obtaining the filling range on the scanning line in the main scanning direction.

According to the present invention, the outline font expanding device that draws sequentially a contour line to form an outline font, based on vector data, and then fills the inside of the outline font to form a dot pattern, includes an outline data storing unit for defining the coordinate system of the vector data on boundaries between dots and then stores the vector data of the outline fonts created on the boundaries; a filling table storing unit for storing a filling table used for obtaining a range to be filled in the inside of the outline font; a filling table preparing unit for preparing the filling table, by dividing the outline font into vector rows chained in the secondary scanning direction, based on the vector data of the outline font stored in the outline data storing unit, by setting information regarding a scanning start position and information regarding a scanning end position, following sequentially in the secondary scanning direction of each vector row, in the filling table, by setting the coordinate in the main scanning direction of the scanning start position information, as an initial value of information regarding a current intersection to the scanning line, of each vector row, in the filling table, by calculating and setting the number of dots as a unit change moved in the main scanning direction in the filling table when the outline font is moved by one dot in the secondary direction of each vector row, and by further adding a value obtained by dividing the unit change by 2 to the initial value of the current information of each vector row; a filling unit for obtaining current intersection information which intersects a scanning line in the main scanning direction moved dot by dot in the secondary direction, as an intersection of the scanning line and the outline font, with reference to the filling table stored in the filling table storing unit, to obtain the filling range along the scanning line in the main scanning direction, then for applying a filling process to the filling range, for adding the unit change to the current intersection information of the vector row intersecting the scanning line to update the filling table, and for moving the scanning line dot by dot in the secondary scanning direction; and a dot data storing unit for storing a dot pattern which is prepared by filling the outline font to each scanning line by means of the filling unit.

As described above, according to the outline font expanding method and the outline font expanding device of the present invention, the inside of an outline font can be filled by creating an outline font on the boundaries between dots and by adding a value obtained by dividing an unit change by 2 to the coordinate of the outline font in the main scanning direction. Hence, the original line width of an outline font can be reproduced faithfully, thus improving effectively and largely the quality of a dot pattern.

According to the present invention, the outline font expanding method that includes the steps of drawing sequentially a contour line to form an outline font and then filling the inside of the outline font to form a dot pattern, based on vector data, includes the steps of interchanging selectively a first expanding process and a second expanding process, with information regarding an outline font to be subjected to a filling process, the first expanding process defining the coordinate of the vector data, based on a dot and applying a filling process to an outline font created on the dots, the second expanding process defining the coordinate of the vector data on the boundaries between dots and applying a filling process to the outline font; and applying the filling process to the outline font.

Moreover, according to the present invention, the outline font expanding device which draws sequentially a contour line to form an outline font and then fills the inside of the outline font to form a dot pattern, based on vector data, includes a first expanding unit that defines the coordinate of the vector data on dots and applies a filling process to the outline font created on the dots; a second expanding unit that defines the coordinate of the vector data on the boundaries between dots and applies a filling process to the outline font; and a switching unit for selecting the first expanding unit or the second expanding unit, according to information regarding an outline font to be subjected to a filling process, to apply the filling process to the outline font.

As described above, according to the outline font expanding method and the outline font expanding device, an outline filling process is performed by selecting the first expanding process (to define a coordinate system on dots) or the second expanding process (to define a coordinate system on boundaries between dots), according to information on the outline font. Thus, the optimum expanding process can be performed according to an outline font. Hence the quality of a low-density dot pattern can be improved while a decrease in a high-density dot pattern expanding performance can be prevented.

BRIEF DESCRIPTION OF THE DRAWINGS

FIG. 6 is a diagram showing a vector table for an outline font in the coordinate system, according to the first embodiment;

FIG. 7 is a diagram showing the initialization state of a filling table, according to the first embodiment;

FIG. 14 is a diagram showing the position of an actual Y-scanning line corresponding to the setting state of the filling table shown in FIG. 13;

FIG. 21 is a diagram showing an example of the setting state of a correction table where the X-scanning line filling process corrects a dropout portion, in the first embodiment;

FIG. 22 is a diagram showing the position of an actual X-scanning line corresponding to the setting state of the correction table shown in FIG. 21;

FIG. 24 is a diagram used for explaining the corrective processing operation processed to the specific X-scanning line in the first embodiment;

FIG. 26 is a diagram showing the dot pattern created by applying the X-scanning line correcting process in the first embodiment;

FIG. 44 is a diagram showing the vector table for an outline font corresponding the conventional coordinate system;

FIG. 53 is a diagram showing a dot pattern created by a conventional filling process;

DESCRIPTION OF THE PREFERRED EMBODIMENTS (a) The Aspect of the Invention

According to the present invention, the outline font expanding method which includes the steps of drawing sequentially a contour line to form an outline font, based on vector data, and then filling the inside of the outline font to form a dot pattern, includes the steps of (1) defining a coordinate system of the vector data on boundaries between dots and then creating the outline font on the boundaries; (2) calculating the number of dots as a unit change moved in the main scanning direction when the outline font is moved by one dot in the secondary scanning direction; (3) adding a value obtained by dividing the unit change by 2 to the coordinate in the main scanning direction of the outline font; (4) moving the scanning line dot by dot in the main scanning direction while obtaining an intersection of the scanning line and the outline font at each move position; and (4) obtaining the filling range on the scanning line in the main scanning direction.

The outline font expanding method further includes the steps of moving said scanning line in the secondary scanning direction to obtain the filling range at all positions in the secondary scanning direction; (5) then interchanging the main scanning direction and the secondary scanning direction; (6) calculating the number of dots as a unit change moved in the main scanning direction when the outline font is moved by one dot in the secondary scanning direction; (7) adding a value obtained by dividing the unit change by 2 to the coordinate of the outline font in the main scanning direction; (8) moving the main scanning line in the main scanning direction dot by dot in the secondary scanning direction while the intersection of the scanning line and the outline font is obtained at each move position; and finding a portion to be filled which is dropped out in the filling range to complement and correct the filling range.

Figure 1:
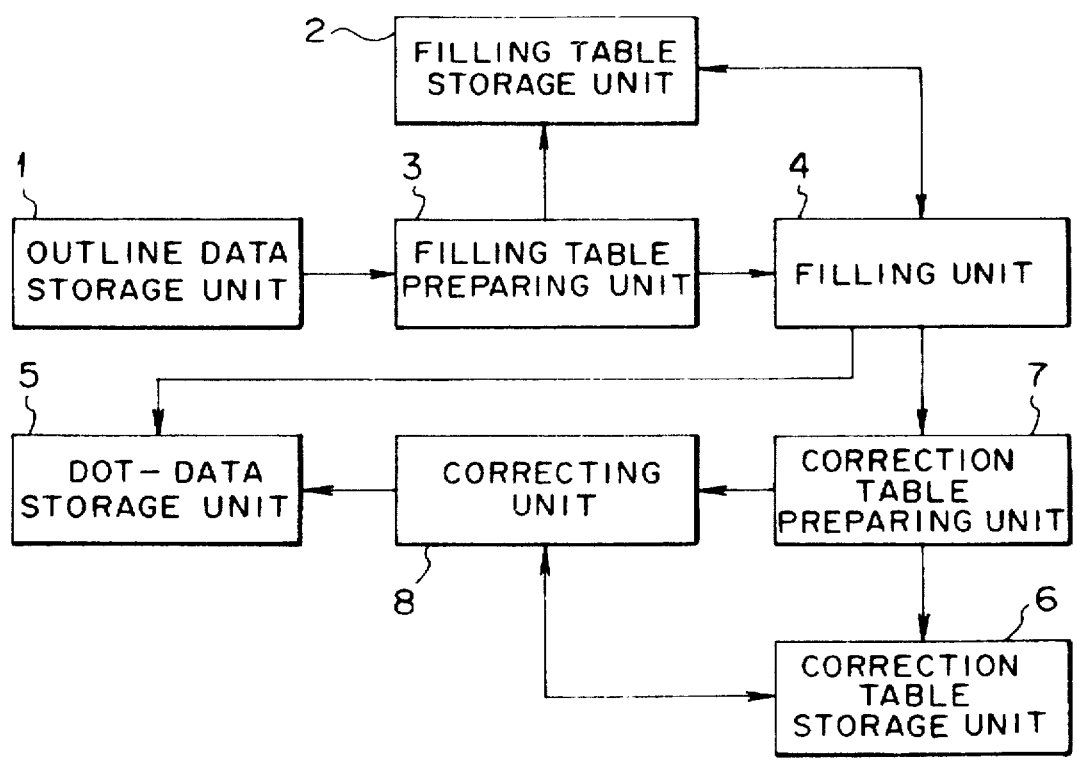
FIG. 1 is a block diagram showing an aspect of the present invention.

FIG. 1 is a block diagram showing the aspect of the present invention and shows a system embodying the outline font expanding method described above. The system creates an outline font by drawing sequentially a contour line, based on vector data, and then creates a dot pattern by filling the inside of an outline font.

Referring to FIG. 1, numeral 1 represents an outline data storing unit that defines the coordinate system for vector data on the boundaries between dots and stores the vector data of an outline font created on the dot boundaries. Numeral 2 represents a filling table storing unit that stores a filling table which is used to find the range of an outline font.

The filling table preparing unit 3 prepares a filling table by dividing an outline font into vector rows chained in the secondary scanning direction, based on the vector data of an outline font stored in the outline font data storing unit 1, by setting information regarding a scanning start point and information regarding a scanning end point, following in the secondary scanning direction, in the filling table every vector row, by setting the coordinate in the main scanning direction of scanning start position information, as an initial value of the current intersection information to the scanning line in the filling table every vector row, by calculating the number of dots as a unit change moved by one dot in the secondary scanning direction every row to set the result in the filling table, and by adding a value obtained by dividing the initial value of the current intersection information by the unit change 2, to the current intersection information every vector row.

The filling unit 4 references a filling table stored in the filling table storing unit 2, obtains the current intersection information regarding a vector row intersecting the scanning line in the main scanning direction moved dot by dot in the secondary scanning direction, as the intersection of the scanning line and the outline font, obtains the filling range in the main scanning direction on the scanning line, applies a filling process to the resultant filling range, adds the unit change to the current intersection information of the vector row intersecting the scanning line to scan the filling table, and then moves the scanning line by one dot in the secondary scanning direction.

Numeral 5 represents a dot data storing unit that stores a dot pattern prepared by filling an outline font every scanning line by means of the filling unit 4. Furthermore, the outline font expanding device also includes a correcting unit 6, a correction table preparing unit 7, and a correcting unit 8.

The correction table storing unit 6 stores a correction table that is used to correct the filling range inside the outline font after the filling unit 4 has completed the filling process.

The correction table preparing unit 7 prepares a correction table by interchanging the main scanning direction and the secondary scanning direction, dividing the outline font into vector rows chained in the secondary scanning direction, based on vector data of an outline font stored in the outline data storing unit 1, setting information regarding the scanning start point and information regarding the scanning end point, following sequentially in the secondary direction, in the correction table every vector row, setting the coordinate in the main scanning direction of the scanning start point information, as an initial value of the current intersection information to the scanning line, in the correction table every vector row, calculating the number of dots moved in the main scanning direction when the outline font is moved by one dot in the secondary scanning direction every vector row and sets the resultant number in the correction table, and adding a value obtained by dividing the unit change by 2 to the initial value of the current intersection information every vector row.

The correcting unit 8 references the correction table stored in the correction table storing unit 6, obtains the current intersection information of a vector row intersecting the scanning line in the main scanning direction moved dot by dot in the secondary scanning direction, as an intersection of the scanning line and an outline font, and obtains the filling range in the main scanning direction on a scanning line, and subjects the resultant filling range to a filling process. When the filling range is less than one dot, the correcting unit 8 complements and writes a dot pattern stored in the dot data storing unit, updates the correction table by adding the unit change to the current intersection information of the vector row intersecting the scanning line, and moves the scanning line dot by dot in the secondary scanning direction.

According to the method or device of expanding outline fonts of the present invention, shown in FIG. 1, the outline data storing unit 1 stores vector data of an outline font created on the dot boundaries between dots which defines the vector data coordinate system.

The filling table preparing unit 3 divides an outline font into vector rows chained in the secondary scanning direction, based on vector data of an outline font stored in the outline data storing unit 1. The filling table storing unit 2 includes a filling table that sets every vector row the scanning start position information and the scanning end scanning information following sequentially the secondary scanning direction, the coordinate in the main scanning direction of the scanning start position information (the initial value of current intersection information to the scanning line), and the number of dots (unit change) in the main scanning direction when the outline font is moved by one dot in the secondary scanning direction. Furthermore, the value obtained by dividing the unit change by 2 is added to the current intersection information every vector row. As a result of the above process, a filling table is created in the filling table storing unit 2.

Thereafter, the filling unit 4 references the filling table in the filling table storing unit 3 to obtain the current intersection information of the vector row in the main scanning direction intersecting the scanning line moved dot by dot in the secondary scanning direction, as an intersection of the scanning line and the outline font, obtains the filling range in the main scanning direction on the scanning line, and subjects the resultant filling range to a filling process. Then the result is stored into the dot data storing unit 5. The filling table is updated when the unit change is added to the current intersection information of the vector row intersecting the scanning line. Then the scanning line is moved dot by dot in the secondary scanning direction.

As described above, according to the present invention, an outline font is formed on the boundaries which are defined between dots in the vector data coordinate system and then the inside of the outline font is filled. In this case, a value obtained by dividing the unit change by 2 is previously added to the coordinate in the main scanning direction of the outline font. This addition quasi-creates the scanning line running between coordinates, or on dots. Hence, the inside of an outline font drawn along the dot boundaries can be filled, whereby the original line width of the outline font can be reproduced faithfully.

After the filling unit 4 has completed the filling process, the correction table preparing unit 7 interchanges the main scanning direction and the secondary scanning direction, and then divides the outline font into vector rows chained in a new secondary scanning direction, based on vector data of the outline font stored in the outline data storing unit 1. In the correction table within the correction table storing unit 6 every vector row is set the scanning start position information and the scanning end position information following sequentially in the secondary direction, the coordinate of the main scanning direction of the scanning start position information (an initial value of the current intersection information of the scanning line), and the number of dots (unit change) in the main scanning direction moved by one dot to the secondary scanning direction. Furthermore, the value obtained by dividing the initial value of the current intersection information by 2 is added to the unit change every vector row. The correction table is prepared through the above-mentioned process.

Thereafter, the correcting unit 8 references the correction table in the correction table storing unit 6, and obtains the current intersection information of a vector row intersecting the scanning line in the main scanning direction moved dot by dot to the secondary scanning direction as an intersection of the scanning line and an outline font, whereby a filling range in the main scanning direction can be obtained along the scanning line. When the filling range is one dot or less in width, the filling unit 8 fills the filling range to complement and write the dot pattern stored in the dot data storing unit 5. At the same time, the unit change is added to the current intersection information of the vector row intersecting the scanning line to update the correction table. Then the scanning line is moved dot by dot in the secondary scanning direction.

As described above, after the filling range has been found, the main scanning direction is switched to the secondary scanning direction. Then, like the operation of the filling unit 4, the correcting unit 8 subjects the dot pattern stored in the dot data storing unit 5 to a complementing and drawing process, based on the correction table in the correcting unit 8. This procedure allows the portion (dropout portion) dropped in the filling range obtained by the filling unit 4 to be complemented and corrected. Such a manner can reproduce faithfully the original line width of the outline font and prevent an occurrence of dropout.

As described above, according to the method and device each of expanding outline fonts of the present invention, where an outline font is created on the boundaries of dots, the value obtained by dividing the unit change by 2 is previously added to the coordinate of the main scanning direction of the outline font. Thus, the inside of the outline font can be filled. The original line width of an outline font can be reproduced so that the quality of the dot pattern can be remarkably improved.

After the filling process, the main scanning direction and the secondary scanning direction are interchanged. The dropout portion to be filled therein is found and filled to correct the filling range. Thus, the original line width can be reproduced faithfully while an occurrence of the dropout can be prevented. This feature contributes to further improving the quality of dot patterns.

Figure 2:
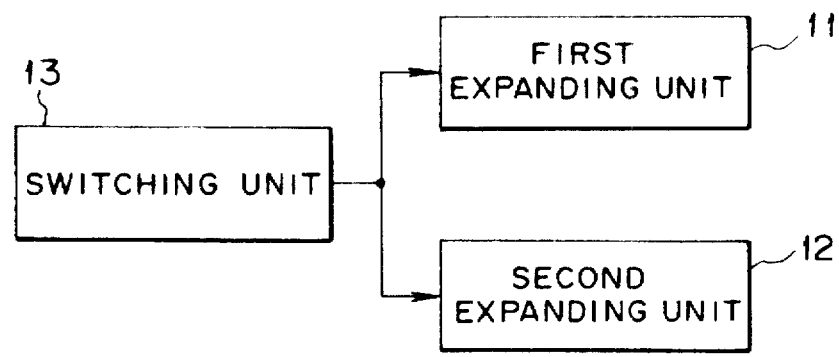
FIG. 2 is a block diagram showing an aspect of the present invention.

FIG. 2 is a block diagram showing an aspect of the present invention. Referring to FIG. 2, the outline font expanding device draws sequentially outlines, based on vector data, to create an outline font, and fills the inside of the outline font to create a dot pattern. In FIG. 2, the outline font expanding device includes a first expanding unit 11 and a second expanding unit 12, and a switching unit 13.

The first expanding unit 11 defines the coordinate system of vector data on dots and subjects an outline font created on dots to a filling process. The second expanding unit 12 defines the coordinate system of vector data on dots and subjects an outline font created on dot boundaries to a filling process. The switching unit 13 selects the first expanding unit 11 or the second expanding unit 12, based on information regarding an outline font to be filled, to subject an outline font to a filling process.

In this case, information regarding an outline font to be filled has the dot size of a dot pattern to be created. Where the dot size is a predetermined threshold or more or more than the threshold, the switching unit 13 selects the first expanding unit 11. When the dot size is less than the threshold or the threshold or less, the switching unit 13 selects the second expanding unit 12.

The information regarding an outline font to be filled pertains to the typeface of an outline font. The switching unit 13 selects the first expanding unit 11 or the second expanding unit, according to the typeface of the outline font. In this case, the dot size threshold and designation information designating the first expanding unit 11 or the second expanding unit 12 are set according to the typeface. When the dot size of a dot pattern to be created is more than the dot size threshold or the threshold or more, the switching unit 13 selects the first expanding unit 11. When the dot size of a dot pattern to be created is less than the dot size threshold, the switching unit 13 selects the first expanding unit 11 or the second expanding unit 12, according to the designation information.

Information regarding an outline font to be filled corresponds to the code range of the outline font. The switching unit 13 may select the first expanding unit 11 or the second expanding unit 12 according to the code range of the outline font. In this case, the dot size threshold and the designation information designating the first expanding unit 11 or the second expanding unit 12 are predetermined, according to the code range. When the dot size of a dot pattern to be created is more than the threshold or the threshold or more, the switching unit 13 selects the first expanding unit 11. When the dot size of a dot pattern to be created is less than the threshold or the threshold or less, the switching unit 13 selects the first expanding unit 12 or the second expanding unit 12, according to the designation information.

Moreover, information regarding an outline font to be filled is regarded as the outline font itself. The switching unit 13 may select the first expanding unit 11 or the second expanding unit 12 every outline font. In this case, the dot size threshold and the designation information designating the first expanding unit 11 or the second expanding unit 12 are set every character. When the dot size of a dot pattern to be created is more than the threshold or the threshold or more, the switching unit 13 selects the first expanding unit 11. When the dot size of a dot pattern to be created is less than the threshold or the threshold or less, the switching unit 13 selects the first expanding unit 11 or the second expanding unit 12, according to the designation information.

Moreover, information regarding an outline font to be filled corresponds to an output device that outputs the expansion result of an outline font. The switching unit 13 may select the first expanding unit 11 or the second expanding unit 12, according to the output device.

In the outline font expanding method or the outline font expanding device, according to the present invention, the switching unit 13 selects the first expanding process (a definition of a coordinate system on dots) by the first expanding unit 11, or the second expanding process (a definition of a coordinate system on boundaries between dots) by the second expanding unit 12, according to information regarding outline fonts. Thus the optimum process (a filling process) can be performed according to an outline font.

In this case, the switching unit 13 performs its switching operation according to the dot size of a dot pattern to be created. Where the dot density is low, the second expanding process that can reproduce faithfully the original line width of an outline font is selected because the first expanding process causes a large influence on the line width per dot. Where the dot density is high, the first expanding process that has a higher processing speed than the second expanding process is selected because the second expanding process causes a small influence on the line width per dot.

The switching unit 13 can perform the optimum expanding process by switching selectively to the first expanding process in the first expanding unit 11 or the second expanding process in the second expanding unit 12, according to the typeface of an outline font.

The switching unit 13 can perform the optimum expanding process by switching selectively to the first expanding process in the first expanding unit 11 or the second expanding process in the second expanding unit 12, according to the code range of an outline font.

The switching unit 13 can select the first expanding process by the first expanding unit 11 or the second expanding process by the second expanding unit 11, according to the outline font itself (character), to execute the optimum expanding process every outline font (character).

Where the switching unit 13 performs a switching operation, according to the typeface of an outline font, the code range, and the character, the first expanding process that is faster than the second expanding process is selected because a high dot density does not affect an increase in the line width per dot in the first expanding process. In the case of the low dot density, the switching unit 13 selects the expanding unit 11 or 12 designated by predetermined designation information.

According to the output device that outputs the expansion result of an outline font, the switching unit 13 can select the first expanding process of the first expanding unit 11 or the second expanding process of the second expanding unit 12 to execute the optimum expanding process.

As described above, according to the outline font expanding method and the outline font expanding device according to the present invention, the filling process is performed to a outline font by selectively switching the first expanding process (in the coordinate system defined on dots) or the second expanding process (in the coordinate system defined on boundaries between dots), in response to outline font information. Thus, the optimum expanding process can be realized according to the outline font. Hence, the quality of a dot pattern with low dot density can be improved and a decrease in the performance of expanding a dot pattern of high dot density can be certainly prevented.

In such a manner, in the case of a pattern of low dot density (low dot size) depending largely on an increase in the line width per dot, the second expanding process that can reproduce faithfully the original line width of an outline font is selected by switching the expanding process according to the dot size of a dot pattern to be created and the output device. Hence the quality of a dot pattern can be largely improved. In the case of a pattern of high dot density (high dot size) not depending on an increase in the line width per dot, the first expanding process has a fast processing speed, thus preventing certainly a decrease in the dot expanding performance.

By selecting an expanding process according to a typeface, the second expanding process reproduces faithfully the original line width of an outline font formed of a thick Gothic type character so that the quality of a dot pattern can be largely improved. As for Ming type characters with relatively thin lines, the first expanding process can certainly prevent a decrease in the dot expanding performance.

By selecting the expanding process according to the code range or character, the second expanding process can be applied to Chinese characters (code table) with a large number of strokes to reproduce the original line width of an outline font. As for symbols and alphanumeric letters with a small number of strokes, the first expanding process can certainly prevent a decrease in the dot expanding performance.

(b) Explanation of First Embodiment

Figure 3:
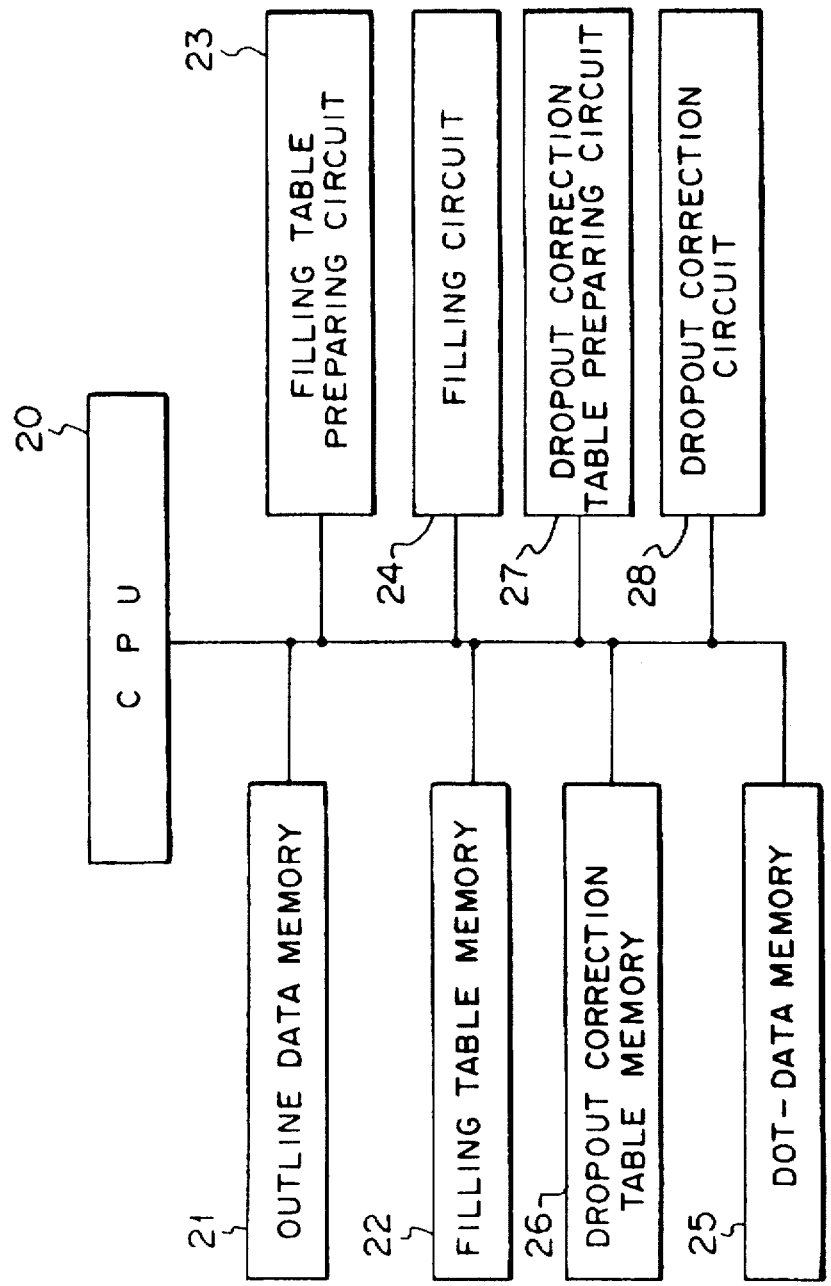
FIG. 3 is a block diagram showing an outline font expanding device according to the first embodiment of the present invention.

FIG. 3 is a block diagram showing an outline font expanding device according to the first embodiment of the present invention. According to the first embodiment shown in FIG. 3, the outline font expanding unit draws basically sequentially a contour line (outline) based on vector data to create an outline font, and fills the inside of the outline font to create a dot pattern.

Referring to FIG. 3, numeral 20 represents a CPU that manages the entire system of the present embodiment and 21 represents an outline data memory (outline data storing unit). In the present embodiment, the outline data memory 21 defines the vector data coordinate system on the boundaries between dots to store the vector data of an outline font.

Numeral 22 represents a filling table memory (filling table storing unit) that stores a filling table (to be set and prepared in the filling table preparing circuit to be described later) that is used to obtain the filling range in the inside of an outline font.

Numeral 23 represents a filling table preparing circuit (filling table preparing unit) that sets and prepares a filling table in the filling table 22.

The filling table preparing circuit 23 prepares a filling table (as described later). In the filling table preparing circuit 23, an outline font is divided into vector rows chained in the Y-axis direction (secondary scanning direction), based on the vector data of an outline font stored in the outline data memory 21. The start vector offset (scanning start position information) and the end vector offset (scanning end position information), following sequentially in the Y-axis direction, are set on the filling table every vector row. The X-coordinate of the start vector offset is set as an initial value of the current intersection (X) to the scanning line in the filling table every vector row. When the outline font is moved in the Y-axis direction by one dot, the number of dots moved in the X-axis direction is calculated as the unit change to set the result in the filling table every vector row. The value obtained by dividing the unit change by 2 is added to the current intersection (X) every vector row.

Numeral 24 represents a filling circuit (filling unit) that fills the filling range in the inside of an outline font while referencing and updating the filling table stored in the filling table 22.

The filling circuit 24 obtains the current intersection (X) of the vector row intersecting the Y-scanning line moved dot by dot in the Y-axis direction, as an intersection of the Y-scanning line and the outline font, in reference to the filling table in the filling table memory 22 (to be described later), obtains the filling range to a filling process, and obtains the filling range in the X-axis direction on the Y-scanning line. The filling circuit 24 also adds the unit change to the current intersection (X) of the vector row intersecting the Y-scanning line to update the filling table and then moves the Y-scanning line dot by dot in the Y-axis direction.

A dot data memory (dot data storing unit) 25 stores a dot pattern created by filling the outline font by the filling circuit 24 every scanning line. A dropout correction table memory (a correction table storing unit) 26 stores a correction table (to be set and prepared in the correction table preparing circuit to be described later) that corrects the filling range in the inside of an outline font after the filling circuit 24 has completed the filling process.

Moreover, a dropout correction table preparing circuit (a correction table preparing unit) 27 sets and prepares a dropout correction table within the dropout correction table 26.

The dropout correction table preparing circuit 27 prepares a dropout correction table (to be described later). In the dropout correction table preparing circuit 27, the main scanning direction and the secondary scanning direction are interchanged. The outline font is divided into vector rows chained in the X-axis direction (secondary direction), based on the vector data of an outline font stored in the outline font memory 11. The start vector offset (scanning start position information) and the end vector offset (scanning end position information), following sequentially in the X-axis direction, are set in the dropout correction table every outline font. The coordinate X of the start vector offset is set as an initial value of the current intersection information to the X-scanning line, in the dropout correction table every vector row. Moreover, when the outline font is moved by one dot in the X-axis direction, the number of dots moved in the Y-axis direction is calculated as the unit change every vector row to set the result in the dropout correction table. The value obtained by dividing the initial value by 2 is added to the initial value of the current intersection (Y) every vector row.

A dropout correction circuit (correcting unit) 28 performs a correcting process to the dropout portion while it references and updates the dropout correction table stored in the dropout correction memory 26.

As described later, the dropout correction circuit 28 obtains the filling range in the Y-axis direction in the X-scanning line by referencing the dropout correction table stored in the dropout correction table memory 26, and by obtaining the current intersection (Y) of the vector row intersecting the X-scanning line moved dot by dot in the X-axis direction, as the intersection of the X-scanning line and the outline font. When the filling range is less than one dot, the dropout correction circuit 28 subjects the filling range to a filling process and subjects the dot pattern stored in the dot data memory 25 to a complementing and writing process. The dropout correction circuit 28 also adds the unit change to the current intersection (Y) of the vector row intersecting the X-scanning line to update the result listed in the dropout correction table and then moves the X-scanning line dot by dot in the X-axis direction.

Figure 4:
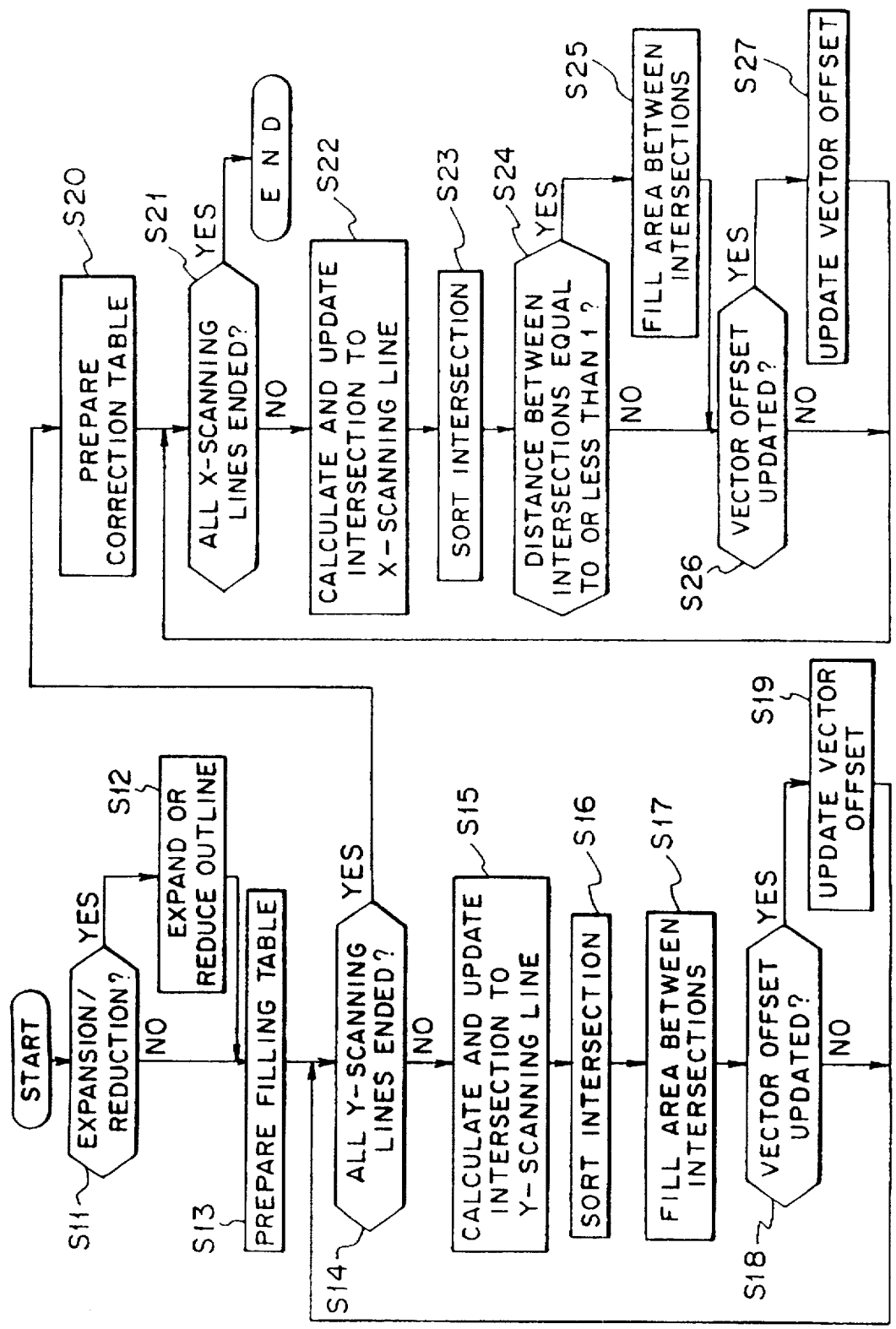
FIG. 4 is a flow chart used for explaining the operation of the first embodiment.

As to the outline expanding device according to the first embodiment, the outline font filling procedure and the dropout correction procedure will be described below according to the flowchart (steps S11 to S27) shown in FIG. 4 and with reference to FIGS. 5 to 30.

(1) It is decided whether a character, symbol, or graphic to be expanded is enlarged or reduced (step S11). If enlargement or reduction is desired (YES decision), the outline data (vector data) to be expanded stored in the outline font data memory 21 is enlarged or reduced to a desired dot size (step S12). In actual, according to the present embodiment, since the coordinate system is defined on the boundaries between dots, the target output dot size (D×D) is enlarged or reduced to ((D+1)×(D+1)).

Where enlargement or reduction is not needed (NO decision in the step S11), or after enlargement or reduction has been performed in the step S12, the filling table preparing circuit 23 prepares the filling table for characters, symbols, and graphics to be expanded) on the filling table memory 22 (step S13).

For example, the case where a filling process is applied to the outline font (alphabet "T") shown in FIG. 5 will be described below.

Figure 5:
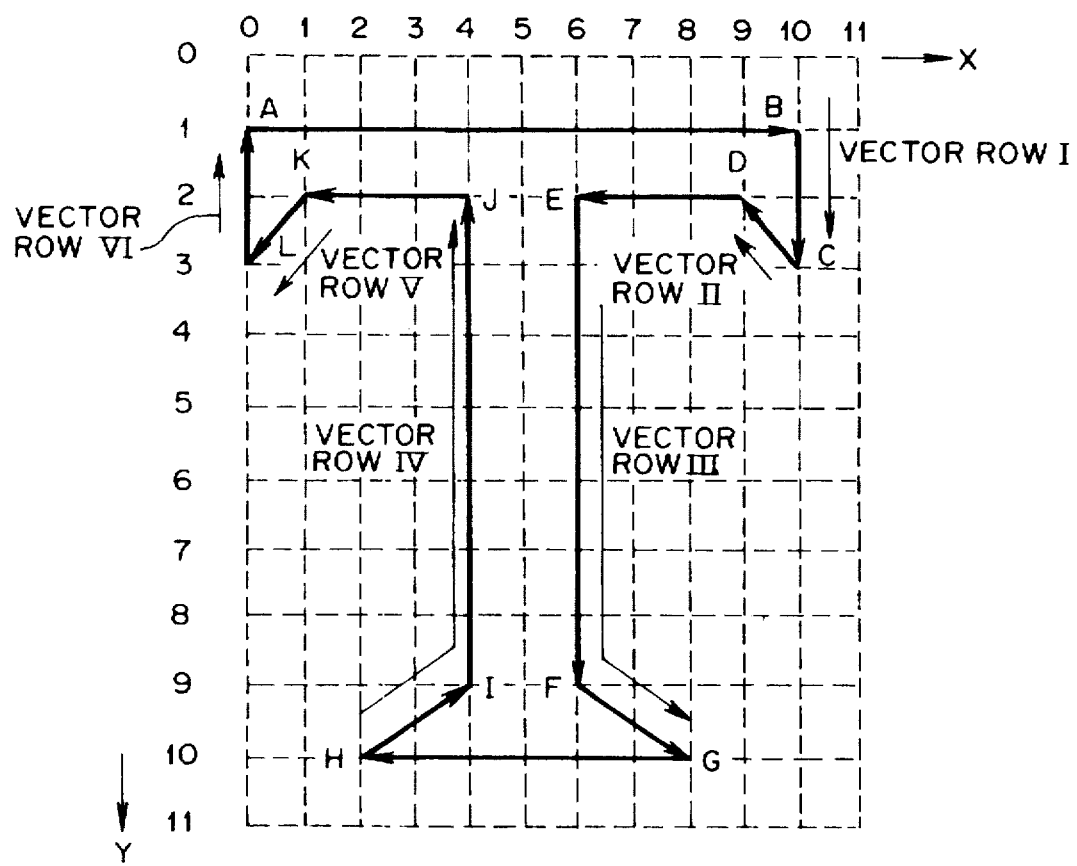
FIG. 5 is a diagram showing in concrete the coordinate system, outline fonts, and Y-directional vector rows in the first embodiment.

In the first embodiment, FIG. 5 shows rectangles as dots defined by broken lines. In FIG. 5, the right direction represents the positive direction of the X-axis and the downward direction represents the positive direction of the Y-axis. The coordinates of the outline font are defined on the boundaries between dots, with the coordinate (0, 0) of the origin, or the apex of the upper left corner in FIG. 5, in the X-Y coordinate system. The vector data of the outline font shown in FIG. 5 is listed on the vector table in the FIG. 6.

In the vector table shown in FIG. 6, the outline font is defined with the X-coordinates and the Y-coordinates of 12 apexes A to L. The apex A nearest to the origin is selected as the starting point (end point). An offset to each apex is set sequentially along the outline from the apex A. The offset "12" has the start point and the end point each which matches the apex A or the end point of the offset "0". The filling range of the outline font is formed as a closed area.

(2) In order to prepare a filling table, the filling table preparing circuit 23 retrieves all vector data to be expanded and obtains the vector table for an outline font to be expanded, for example, as shown in FIG. 6. The outline forming vector is divided into vector rows chained upward (Y-axis in a negative direction) and vector rows chained downward (Y-axis in the positive direction), based on the resultant vector table, and then sets the directivity in the filling table shown in FIG. 7 (refer to "up"/"down" shown in FIG. 7). In this case, the horizontal vector (in the X-axis direction) is neglected.

In the embodiment shown in FIG. 5, the outline fonts are divided into 6 vector rows: the vector row I extending downward from the point B to the point C, the vector row II extending upward from the point C to the point D, the vector row III extending downward to the point G through the points E and F, the vector row IV extending upward to the point J via the points H and J, the vector row V extending downward from the point K to the point L, and the vector row VI extending upward from the point L to the point A. In the filling table shown in FIG. 7, the vectors I to VI correspond to numbers "0" to "5", respectively.

(3) The offset of a vector row with the minimum Y-coordinate among vector rows is retrieved from the vector table and set as a start vector in the filling table. Similarly, the offset of a vector row with the maximum Y-coordinate among vector rows is retrieved from the vector table and set as an end vector in the filling table.

(4) Next, when the start vector of each vector row set on the filling table is moved by one dot in the positive direction of the Y-axis, the change (the number of dots) in the X-axis direction is calculated, based on data on the vector table, and set as a unit change in the filling table.

For example, as shown in FIGS. 5 and 7, the start vectors of the vector rows I, III, IV, and VI are in parallel to the Y-axis and do not change in the X-axis direction. Hence the unit change is 0. When the start vector of the vector II moves by one dot in the positive direction of the Y-axis, it changes by one dot in the positive direction of the X-axis. Hence the unit change is +1. When the start vector of the vector row V moves by one dot in the positive direction of the Y-axis, it changes by one dot in the negative direction of the X-axis. Hence the unit change is −1.

(5) According to the present embodiment, the X-coordinate of the start vector of each vector row set as described above is retrieved from the vector table. As shown in FIG. 7, as an outline font is quasi-viewed as one arranged in the conventional dot coordinate system, a value obtained by adding previously (a unit change in the X-direction/2) to the X-coordinate of the start vector is set as an initial value of the current intersection (X) in the filling table.

(6) The filling table is prepared through the steps (2) to (5) to set various values as shown in FIG. 7. The filling circuit 24 performs the main scanning in the positive direction of the X-axis and the secondary scanning in the positive direction of the Y-axis, with reference to the filling table, to calculate the intersection of each vector row and the Y-scanning line. Thus a filling process is performed to the outline font. The steps (7) to (9) are repeated till it is judged that the filling process has been completed by a target Y-coordinate size (vertical size), or to all the Y-scanning lines in the step S14.

Figures 8, 9:
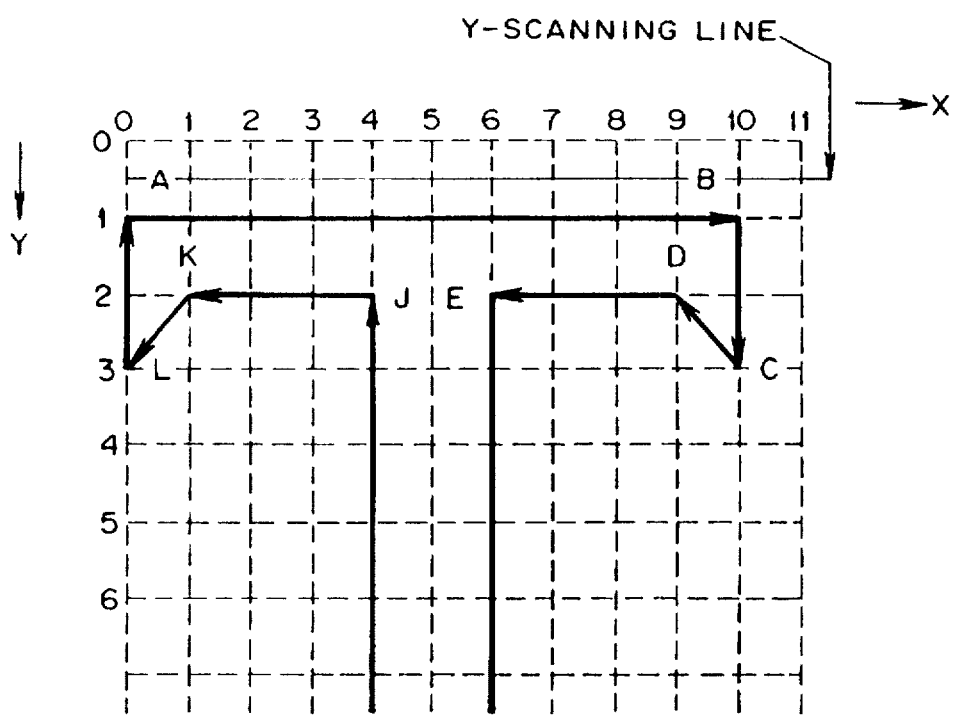
FIG. 8 is a block diagram showing the position of an actual Y-scanning line corresponding to the initialization state of the filling table shown in FIG. 7.
FIG. 9 is a diagram showing the setting state of a filling table where the Y-scanning line intersects first an outline font, according to the first embodiment.
Figures 10, 11:
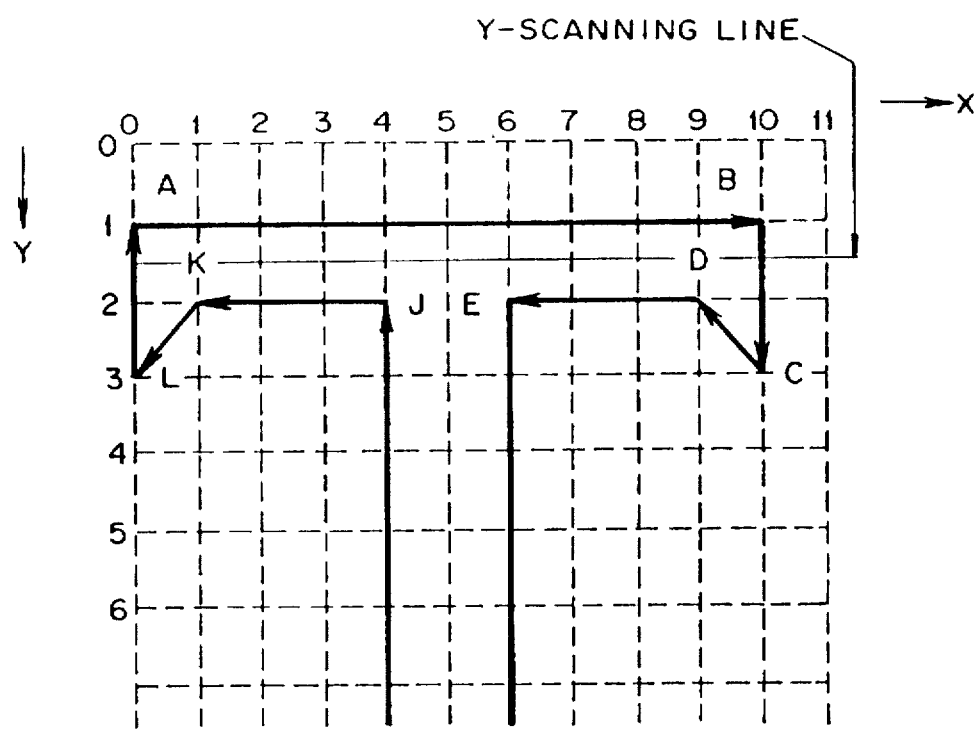
FIG. 10 is a diagram showing the position of an actual Y-scanning line corresponding to the setting state of the filling table shown in FIG. 9.
FIG. 11 is a diagram showing the setting state of a filling table after the start vector offset has been updated in the first embodiment.

(7) That is, it is judged whether processes to all the Y-scanning lines have been completed (step S14). At the same time, as shown in FIGS. 8 and 10, the filling table is updated by apparently moving the Y-scanning line along the chained dots dot by dot from the Y-coordinate (0.5) in the positive direction of the Y-axis and calculating all the intersections of the current Y-scanning line and an outline font at each point, based on data of the filling table (step S15). The resultant intersection corresponds to the current intersection in the filling table.

As to the vector row intersecting the Y-scanning line, the filling table is updated by adding once a unit change to the current intersection (X) every time the Y-scanning line is moved by one dot. The intersection of the Y-scanning line running on dots and an outline font drawn on the dot boundaries (or the intersection of the Y-scanning line arranged on the dot boundaries and an outline font apparently arranged on dots) can be apparently obtained only by referencing once the current intersection (X) of the vector row intersecting the Y-scanning line in the filling table.

For example, when the Y-scanning line is moved from the Y-coordinate (0.5) shown in FIG. 8 to the Y-coordinate (1.5) shown in FIG. 10, the Y-scanning line intersects the vector rows I and VI. "1" and "0" can be obtained as the X-coordinate of the current intersection from the filling table (refer to the shaded portion in FIG. 9).

(8) All the intersections obtained in the step S15 are sorted (step S16). Then areas between the sorted intersections are filled alternately and transferred to the dot memory for the current Y-coordinate (step S17). The area between two intersections is filled. If many intersections (for example, 6 intersections where the Y-coordinate (2.5) is scanned in the Y-axis direction) are obtained, the sorting process is needed in the step S16 to judge what is the area between intersections to be filled.

(9) It is checked whether the vector intersecting the current Y-scanning line intersects the next Y-scanning line moved by one dot in the positive direction of the Y-axis. If not intersected (in the case of the vector offset updated or YES decision in the step S18), the offset of the start vector of the current vector row is changed into the next vector. The unit change in the X-axis direction of the resultant vector is calculated to set in the filling table. At the same time, the sum of (a unit change/2) and the X-coordinate of the updated start vector is set as an initial value to the current intersection and then updated (step S19). Then the flow goes to the step S14.

As shown in FIG. 7, when a filling table is prepared in the step S13, the updating process described above is not needed in the step S19 if the unit change and the current intersection in each vector row are set in the filling table. Hence, an updating process is performed merely by switching the vector row to the next vector row to reference the current intersection on the filling table.

Where the vector intersecting the current Y-scanning line intersects the next Y-scanning line moved by one dot in the positive direction of the Y-axis (in the case of the vector offset not updated or NO decision in the step S18), the flow goes to the step S14.

Figures 12, 13:
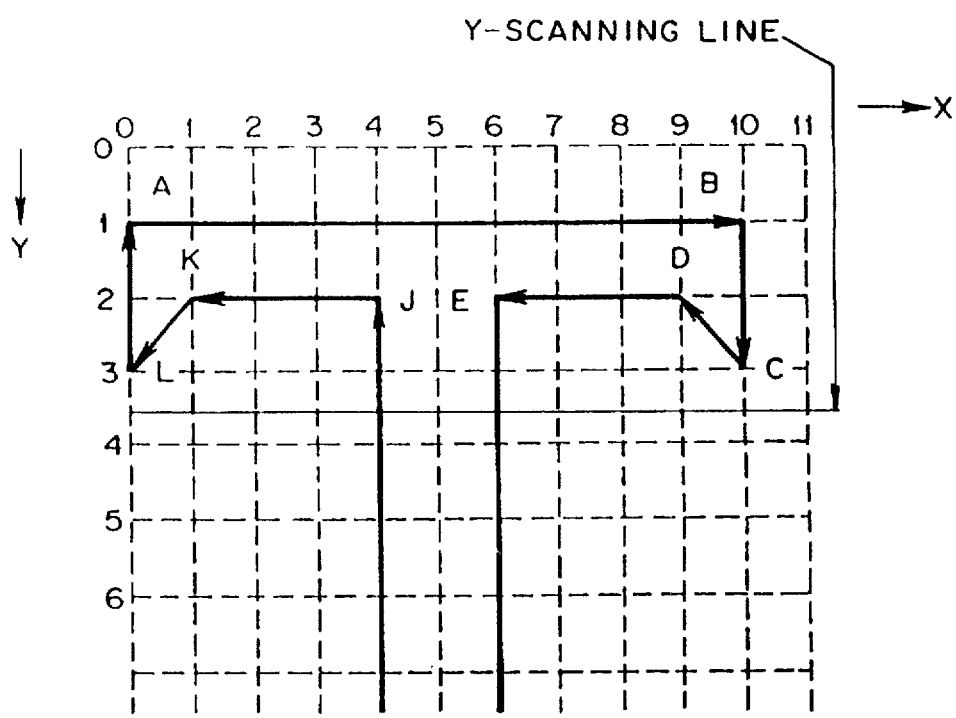
FIG. 12 is a diagram showing the position of an actual Y-scanning line corresponding to the setting state of the filling table shown in FIG. 11.
FIG. 13 is a diagram showing an example of the setting state of the filling table where a dropout is caused by the Y-scanning line filling process in the first embodiment.

As shown in FIG. 12, where the Y-scanning line runs the Y-coordinate (3.5), the filling table is updated as shown in FIG. 11.

Figure 15:
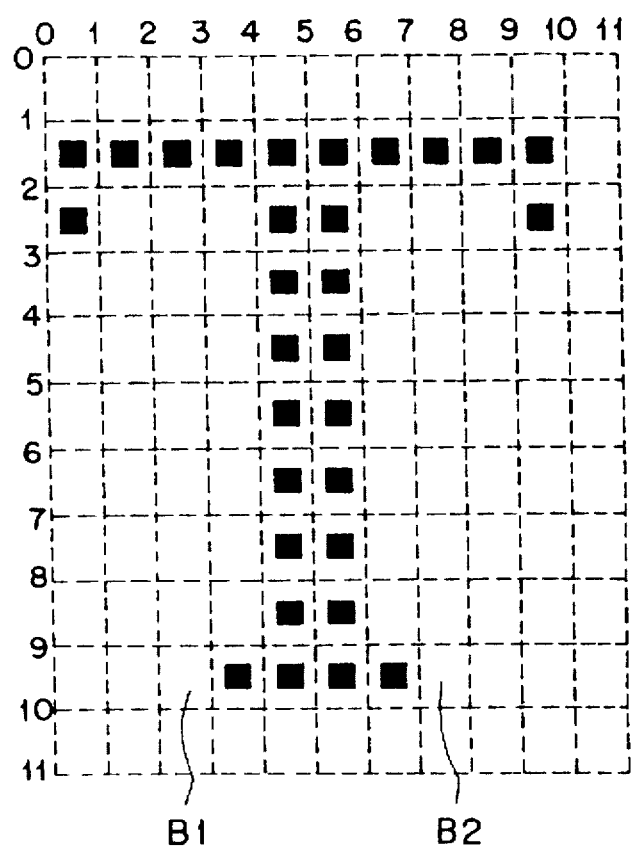
FIG. 15 is a diagram showing a dot pattern created by the Y-scanning line filling process in the first embodiment.

For example, the dot pattern shown in FIG. 15 can be obtained by subjecting the outline font as shown in FIG. 5 to the filling process. Then the dot pattern is stored the dot data memory 25.

In the present embodiment, where the filling table preparing circuit 23 and the filling circuit 24 operate, a portion which is originally continued in an outline font may be dropped out.

Figure 16:
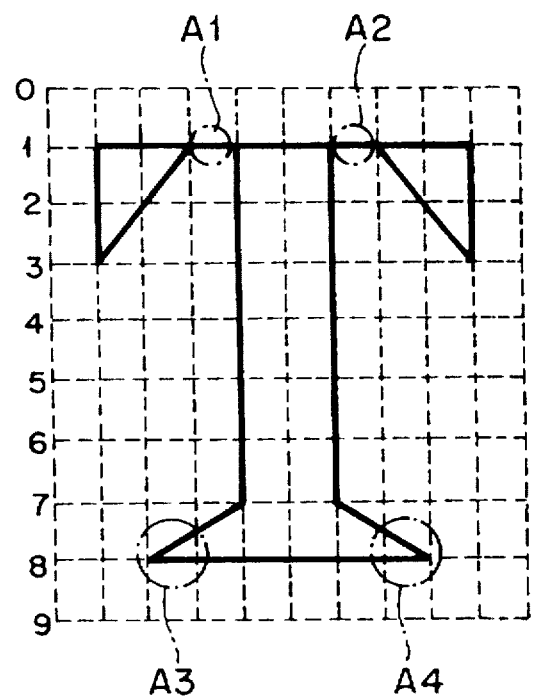
FIG. 16 is a diagram showing an example of an outline font having a portion of a line width of less than one dot.
Figure 17:
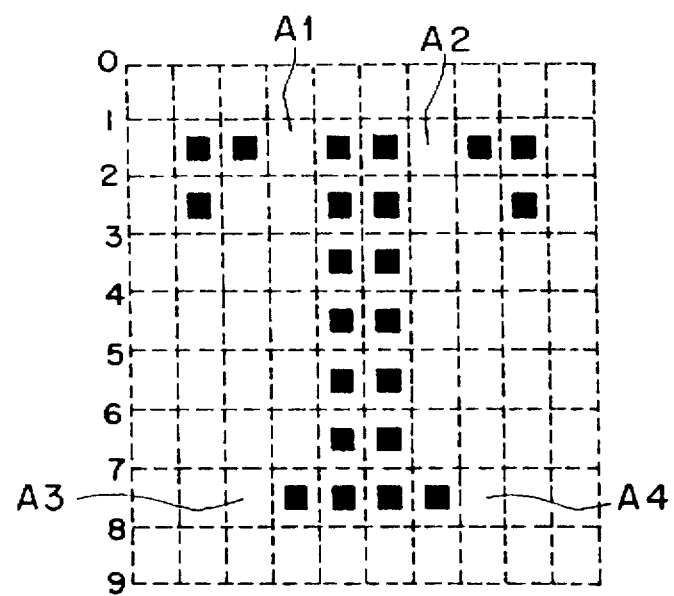
FIG. 17 is a diagram showing a dot pattern with a dropout created by applying the Y-scanning line filling process to the outline font shown in FIG. 16.

For example, as shown in FIG. 16, where the filling process is applied to the outline font including portions A1 to A4 each with a line width of less than one dot, the portions A1 to A4 each without one-dot weighted are not shown as dots. Therefore, the portions are dropped out, as shown in FIG. 17.

Where a filling process is performed to the outline font shown in FIG. 5, the dropout occurs. As shown in FIG. 14, where the Y-scanning line runs on the Y-coordinate (9.5), the filling table is updated as shown in FIG. 13. The current intersection has the X-coordinates (3) and (7). Then four dots between the coordinates are filled as shown in FIG. 15. In actual, there are a portion with less than one dot between the X-coordinates (3) and (7) and a portion with less than one dot between the coordinates (7) and (8). The two dots B1 and B2 shown in FIG. 15 are unfilled and dropped out.

According to the following steps (10) to (17) of the present invention, the dropout correction table preparing circuit 27 and the dropout correction circuit 28 find the dropout portions to complement and correct the dot pattern stored in the dot data memory 25.

Figures 19, 20:
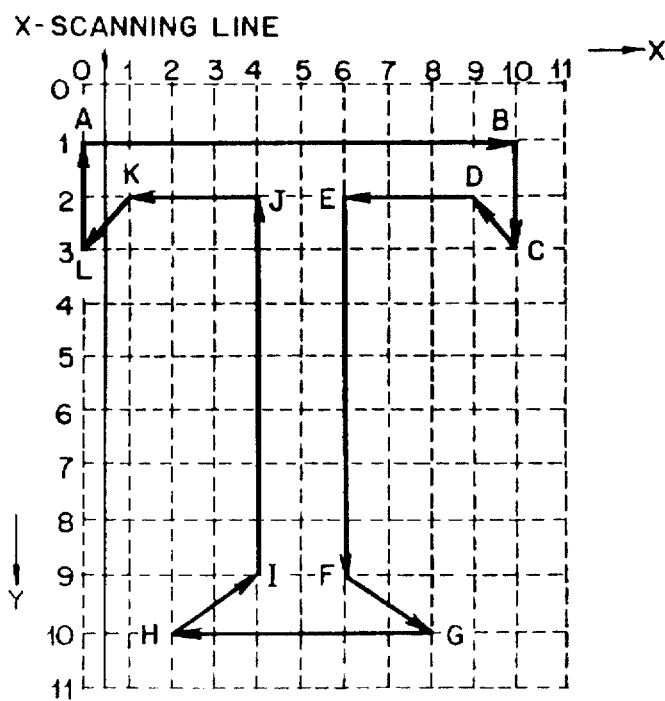
FIG. 19 is a diagram showing the initialization state of a correction table according to the first embodiment.
FIG. 20 is a diagram showing the position of the X-scanning line where the X-scanning line intersects first the outline font in the first embodiment.

(10) In order to prepare a dropout correction table (step S20), the dropout correction table preparing circuit 27 divides the outline forming vector into the vector rows chained in the right direction (or the positive direction of the X-axis) and the vector rows chained in the left direction (or the negative direction of the X-axis). The directivity is set in the dropout correction table as shown in FIG. 19 (refer to "right"/"left" in FIG. 19). In this case, the vertical direction vector (in the Y-axis direction) is neglected.

The filling table is scanned horizontally. However, the dropout correction table is vertically scanned after interchanging the main scanning direction and the secondary scanning direction. The dropout correction table differs from the filling table in directivity.

In concrete terms, the outline font shown in FIG. 5 is divided into 6 vector rows: the vector row I extending from the point A to the point B in the right direction, the vector row II reaching the point E via the points C and D in the right direction, the vector row III extending from the point F to the point G in the right direction, the vector row IV extending from the point G to the point H in the left direction, the vector row V extending from the point H to the point I in the right direction, and the vector row VI reaching the point L via the points J and K in the left direction. In the dropout correction table shown in FIG. 19, the vector rows I to VI represent to numbers "0" to "5".

(11) The offset of the vector row with the minimum X-coordinate is retrieved from the vector table and then set as a start vector in the filling table. Likewise, the offset of the vector row with the maximum X-coordinate is retrieved from the vector table and then set as an end vector in the filling table.

(12) Next, when the start vector of each vector row set in the dropout correction table is moved by one dot in the positive direction of the X-axis, the change (the number of dots) in the Y-axis direction is calculated, based on data listed on the vector table, and then set as a unit change in the dropout correction table.

Figure 18:
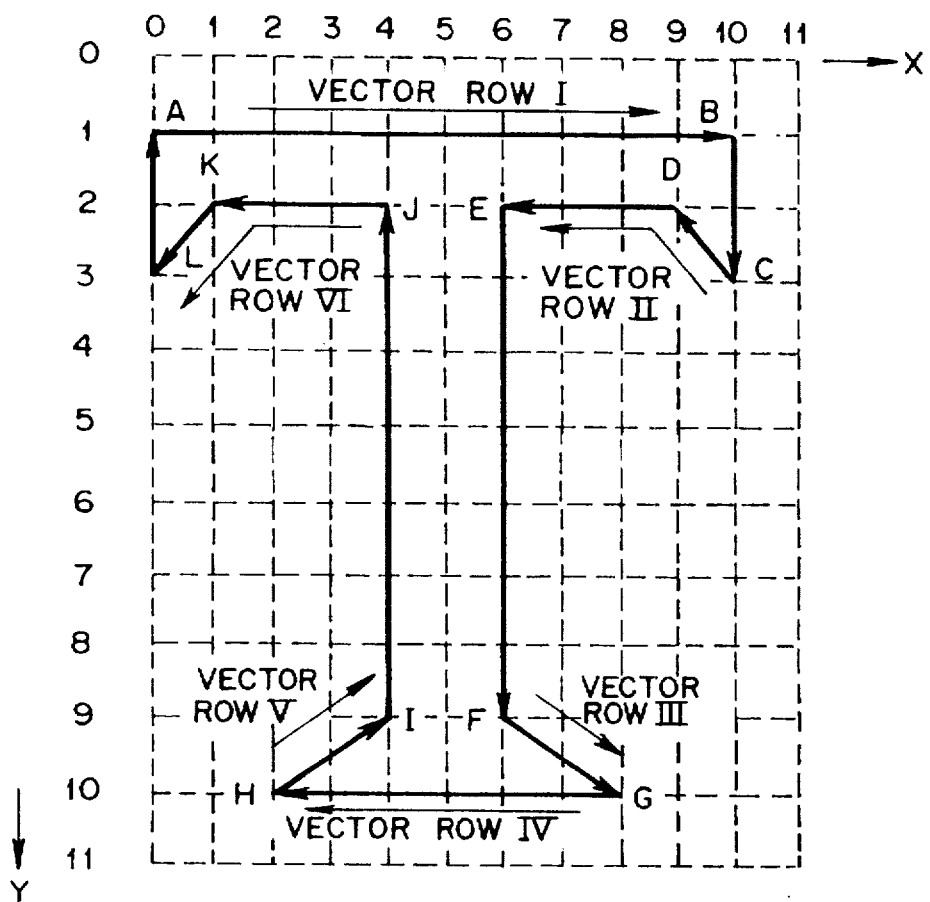
FIG. 18 is a diagram showing an embodiment of the X-directional vector rows in the outline font shown in FIG. 5.

For example, as shown in FIGS. 18 and 19, the start vectors of the vector rows I, II, and IV are in parallel to the X-axis and have no change in the Y-axis direction. When the start vector of the vector row III moves one dot in the positive direction of the X-axis, it changes 0.5 dots in the positive direction of the Y-axis. The unit change is +0.5. The start vector of the vector row V moves one dot in the positive direction of the X-axis, it changes 0.5 dots in the negative direction of the Y-axis. The unit change is −0.5. The start vector of the vector row VI moves one dot in the positive direction of the X-axis, it changes one dot in the negative direction of the Y-axis. The unit change is −1.

(13) The initial value of the intersection (Y) of each vector row is calculated. The Y-coordinate of the start vector set to each vector is retrieved from the vector table. In order to display the outline font apparently arranged in the conventional dot coordinate system, the value obtained by previously adding (a unit change in the Y-direction/2) to the Y-coordinate of the start vector is set as the initial value of the current intersection (Y) in the dropout correction table, as shown in FIG. 19.

(14) A dropout correction table in which various values are set as shown in FIG. 19 is prepared according to the following steps (10) to (13). With reference to the dropout correction table, the dropout correction circuit 28 subjects a dot pattern to a dropout correction process by performing the main scanning in the positive direction of the Y-axis and the secondary scanning in the positive direction of the X-axis, and then calculating the intersection of each vector row and the X-scanning line. The following steps (15) to (17) are repeated till it is judged that the dropout correction process has been completed to all the X-scanning lines in the step S21 by a target output X-coordinate size (horizontal size).

(15) It is decided whether all the X-scanning lines have been completed (step S21). At the same time, as shown in FIGS. 20 and 22, the X-scanning line is apparently moved dot by dot along dots from the X-coordinate (0.5) in the positive direction of the X-axis. At each point, all intersections of the current X-scanning line and the outline font are calculated, based on the data listed in the dropout correction table and then updates the current intersection (Y) in the dropout correction table (step S22). The resultant intersection relates to the current intersection in the dropout correction table.

Like the filling table described above, as to the vector row intersecting the X-scanning line, the unit change is added once to the current intersection (Y) every time the X-scanning line is moved by one dot so that the dropout table is updated. The intersection of the Y-scanning line arranged along dots and an outline arranged on the boundaries (or the intersection of the Y-scanning line arranged on the dot boundaries and an outline font apparently arranged on dots) can be found only by referencing the current intersection (Y) of the vector row intersecting the X-scanning line in the dropout correction table.

For example, the X-scanning line intersects at the X-coordinate (0.5) shown in FIG. 20 and the X-scanning line intersects the vector rows I and VI. The coordinate having the current X-coordinates (1) and (2.5) is found in the dropout correction table shown in FIG. 19.

(16) After all intersections obtained in the step S22 are sorted (step S23), areas between intersections sorted are retrieved alternately. Then it is decided whether the distance between intersections is equal to or less than one dot (step S24). In the case of equal to or less than one dot (YES decision), the corresponding dots in the dot data memory 25 are filled (step S25) so that the dropout portions of a dot pattern stored in the dot data memory 25 are complemented and drawn.

Figure 23:
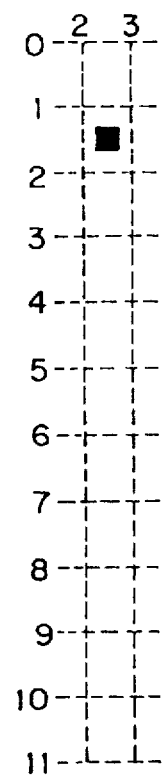
FIG. 23 is a diagram showing a dot at a specific X-scanning line in the first embodiment, filled by the filling process.

For example, as shown in FIG. 22, where the X-scanning line has its X-coordinate (2.5), the X-scanning line intersects the vector rows I, IV, V, and VI. At this point, the intersections of the X-scanning line and the outline font, having the four Y-coordinates (1), (2), (9.75), and (10), can be obtained with reference to the current intersection (Y) of the dropout correction table updated as shown in FIG. 21 (refer to FIG. 24). The filling unit 24, as shown in FIG. 23, fills only dots at the coordinates (2.5, 1) and (2.5, 2) on the X-scanning line running at the X-coordinate (2.5).

The range to be filled, as shown in FIG. 24, is defined between the Y-coordinates "1" and "2" and between the Y-coordinates "9.75" and "10" by sorting the resultant four intersections. The distance DY3 between the intersections is 0.25 dots and the distance DY4 between the intersections is less than 0.25 dots. The filling process or the dropout correction process is performed to the area of one dot or less.

Figure 25:
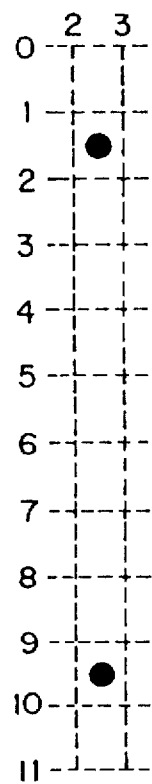
FIG. 25 is a diagram showing a dot at the specific X-scanning line filled by the correcting operation, in the first embodiment.

Thus, the dropout portion, or a portion where the filling circuit 24 has failed to fill at the time of the filling process, is corrected as shown in FIG. 25. Finally, the dots B1 and B2 dropped out in FIG. 15 can be filled and corrected as shown in FIG. 26 to perform the filling process and the dropout correcting process.

(17) If the distance of the intersections are more than one dot (NO decision in the step S24), or after the filling process has been performed in the step S25, it is checked whether the vector intersecting the current X-scanning line intersects the next X-scanning line by one dot in the positive direction of the X-axis. If not intersected (in the case of updating the vector offset or YES decision in the step S26), the offset of the start vector of the current vector row is changed into the next vector. The unit change in the Y-axis direction of the resultant vector is calculated and then set in the dropout correction table. At the same time, the value obtained by adding (the unit change /2) to the Y-coordinate of the updated start vector is set and updated as an initial value to the current intersection (step S27). Then the flow goes to the step S21.

As shown in FIG. 19, where a dropout correction table is prepared in the step S27, the updating process described above is not needed in the step S27 merely by setting the unit change and current intersection of each of all vector rows to the dropout correction table. Hence, the updating process is performed merely by changing the vector row to which the current intersection is referenced in the dropout correction table to the next vector row.

On the other hand, where the vector intersecting the current scanning line intersects the next X-scanning line moved by one dot in the positive direction of the X-axis (or in the case of the vector offset not updated or NO decision in the step S26), the flow goes to the step S21 without any change.

As described above, according to the first embodiment of the present invention, where the coordinate system for vector data is defined on the boundaries between dots and an outline font is created on the dot boundaries, the scanning line is apparently arranged on dots by previously adding the value obtained by dividing the unit change by 2 to the coordinate in the main scanning direction of an outline font. Thus the inside of the outline font can be filled, whereby the original line width of an outline font can be reproduced. This feature allows the quality of a dot pattern, particularly, the quality of the dots for low resolution (low dot density) to be largely improved.

Figure 27:
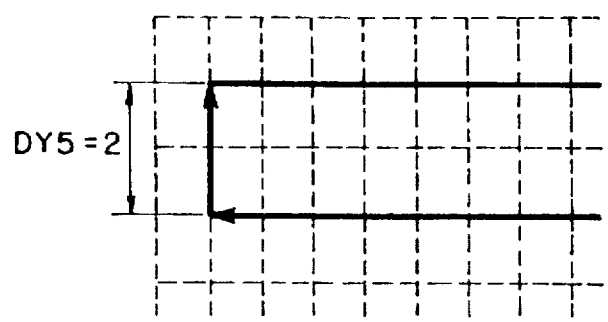
FIG. 27 is a diagram showing an outline font with a two-dot line width in the coordinate system, according to the first embodiment.
Figure 28:
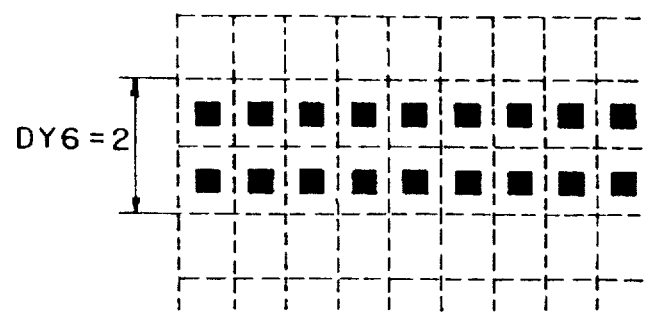
FIG. 28 is a dot pattern created by applying the filling process in the first embodiment to the outline font shown in FIG. 27.

For example, when the filling process according to the present embodiment is applied to an outline font with a line width of 2 dots, shown in FIG. 27, the dot pattern with an original line width of 2 dots faithfully reproduced can be obtained, as shown in FIG. 28.

Figure 29:
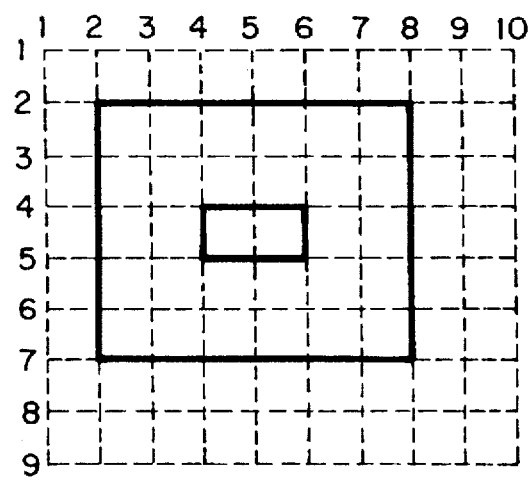
FIG. 29 is a diagram showing an example of an outline font with the middle portion having a blank portion of one-dot width in the coordinate system, in the first embodiment.
Figure 30:
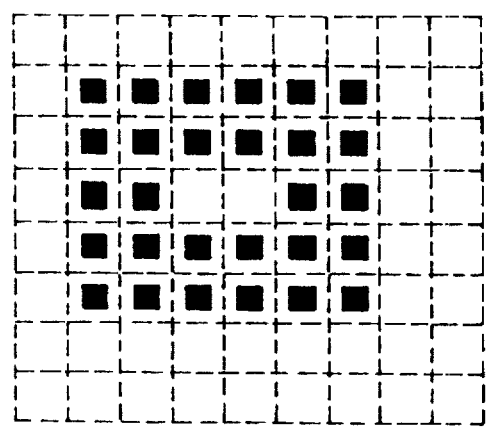
FIG. 30 is a diagram showing a dot pattern created by applying the filling process of the first embodiment to the output line font shown in FIG. 29.
Figure 31:
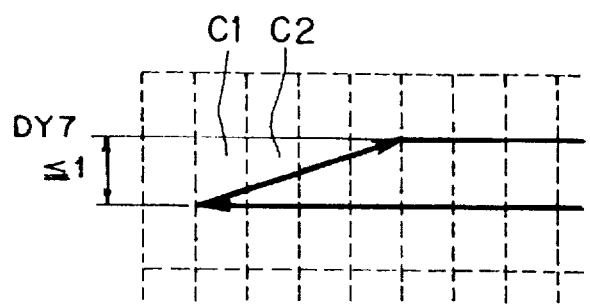
FIG. 31 is a diagram showing an outline font with the width of less than one dot in the coordinate system, in the first embodiment.
Figure 32:
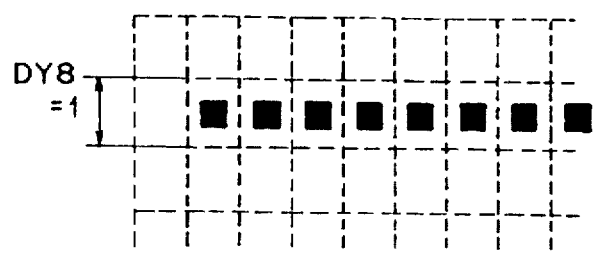
FIG. 32 is a diagram showing a dot pattern created by applying the filling process and the correction processing of the first embodiment to the outline font shown in FIG. 31.
Figure 57:
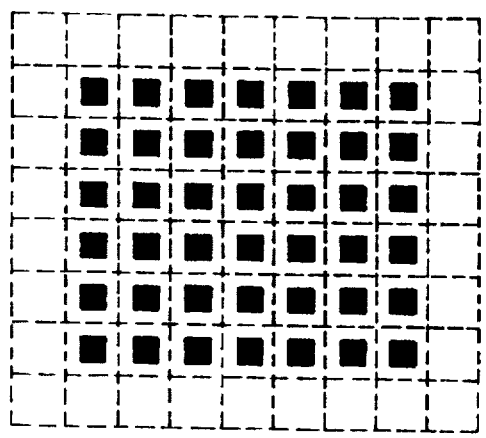
FIG. 57 is a diagram showing a dot pattern created by applying the conventional filling process to the outline font shown in FIG. 56.

In an outline font having the blank middle portion of a width of one dot, as shown in FIG. 29, the prior art filling process fills up the blank portion as shown in FIG. 57. However, the filling process according to the present embodiment can reproduce faithfully the dot pattern with a blank portion in the middle portion thereof, as shown in FIG. 30.

Furthermore, according to the first embodiment of the present invention, after a dot pattern is created once in the dot data memory 25, the main scanning direction is interchanged with the secondary scanning direction. While the dropout correction table created by the dropout correction table preparing circuit 27 is referred, the dropout correction circuit 28 complements and draws the unfilled portion (dropout portion) with a space of one dot or less. Hence the above procedure can realize the original line width faithfully reproduced, the dropout occurrence certainly prevented, and the improved quality in dot pattern.

According to the first embodiment, the case where the alphabet "T", shown in FIG. 5, is applied to the filling process has been described. However, the present invention should not be limited to the above embodiment. The present invention is applicable to dot-expand other various characters, symbols, and graphics. Function and effect similar to those of the above mentioned embodiment can be obtained.

In the first embodiment, the X-scanning operation is applied at the correction time after the Y-scanning operation. However, the Y-scanning operation may be applied at the correction time after the X-scanning operation.

(c) Explanation of Second Embodiment

As described above, in the filling process in which the coordinate of an outline font is defined on each dot, the line width of a dot pattern expanded is incremented one dot to the original line width of the outline font, or the blank portion with a width of one dot is filled up. Particularly, a dot pattern of low dot density is largely influenced by the above phenomenon, thus degrading the quality of dot patterns.

To the contrary, as shown in the first embodiment, the filling process by which the coordinate of an outline font is defined on the dot boundaries can realize faithfully the original line width of an outline font. In this case, the scanning operation must be bidirectionally performed to amend the dropout portion, thus doubling the expanding time, compared with the conventional expanding time. Particularly, a dot pattern of high dot density is influenced exponentially and may cause a decrease in performance of the dot expanding process.

According to the second embodiment, two expanding systems are selectively switched according to information regarding an outline font. The two expanding methods includes the first expanding method (outline expanding method 1) that applies a filling process to an outline font which is created by defining a vector data coordinate method on dots and the second expanding method (outline expanding method 2) that applies a filling process to an outline font which is created by defining a vector data coordinate method on the boundaries between dots. Thus, with the improved quality of a dot pattern of low dot density, a decrease in the performance of the high dot density expanding process can be prevented.

Figure 33:
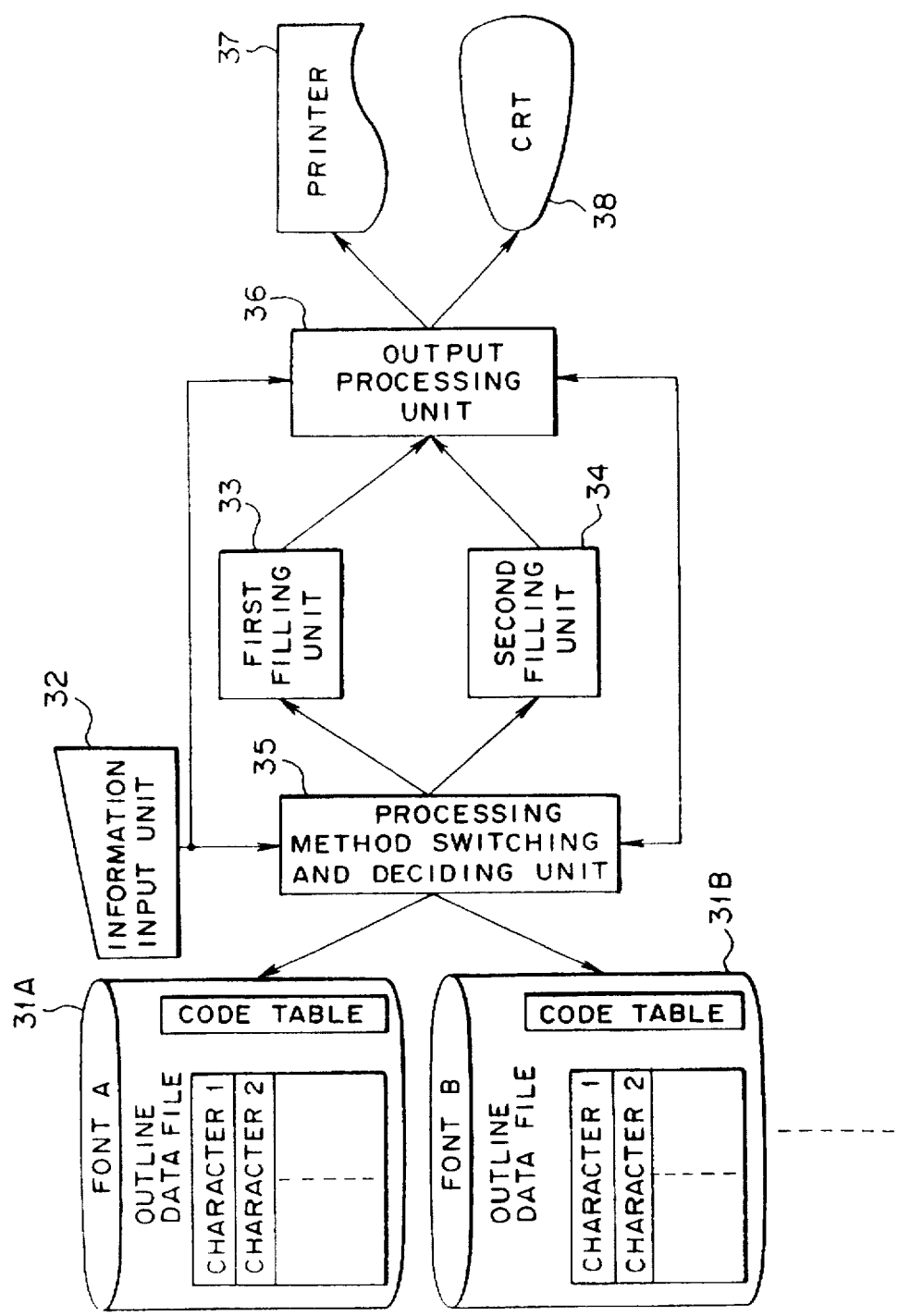
FIG. 33 is a block diagram showing the outline font expanding device according to the second embodiment of the present invention.

FIG. 33 is a block diagram showing the outline font expanding device according to the second embodiment of the present invention. Referring to FIG. 33, basically, the outline font expanding device draws sequentially a contour line (outline), based on vector data, to create an outline font, and then fills the inside of the outline font to create a dot pattern.

Referring to FIG. 33, the outline data file 31A is arranged, for example, every typeface (typefaces A and B in FIG. 33, for example, Ming type, Gothic type, etc.). Outline font data stored in the file 31A is manifested by straight line data or a curve approximation mathematical model (Bezier curve, spline curve, etc.) in vector form. The outline data file 31B is arranged, for example, every typeface (typefaces A and B in FIG. 33, for example, Ming type, Gothic type, etc.). Outline font data stored in the file 31B is manifested by straight line data or a curve approximation mathematical model (Bezier curve, spline curve, etc.) in vector form.

The file 31A stores previously process method designation information to designate selectively the first expanding method or the second expanding method every typeface (such as Ming type, Gothic type, etc.), code table (code range: symbol / alphanumeric/Hiragana/Katakana/Chinese characters, etc.) and character, according to uses. The file 31B stores previously process method designation information to designate selectively the first expanding method or the second expanding method every typeface (such as Ming type, Gothic type, etc.), code table (code range: symbol/ alphanumeric/Hiragana/Katakana/Chinese characters, etc.) and character, according to uses.

In the second embodiment, five expanding process switching methods are as follows:

(1) The expanding method is switched according to the output dot size (the dot size of a pattern to be created) larger or smaller than the dot size threshold to be previously set.

(2) The outline data file 31A stores previously the process method designation information that designates the expanding method according to typefaces. The outline data file 31B stores previously the process method designation information that designates the expanding method according to typefaces.

(3) The outline font data file 31A also sets process method designation information that designates the expanding method, according to each of code tables divided into the code tables for symbols/alphanumeric letters/Hiragana/ Katakana/Chinese characters, etc., and character, by means of character codes. The outline font data file 31B also sets process method designation information that designates the expanding method, according to each of code tables divided into the code tables for symbols/alphanumeric letters/ Hiragana/Katakana/Chinese characters, etc., and character, by means of character codes.

(4) The outline data file 31A sets previously the process method designation information that designates the optimum expanding method every character. The outline data file 31A sets previously the process method designation information that designates the optimum expanding method every character.

(5) The expanding method is switched according to the output device that outputs the expansion result of an outline font.

Numerical 32 represents an information input unit that includes, for example, a keyboard. The information input unit 32 inputs switching method designation information that designates a desired one among the expanding method switching procedures (1) to (4), a dot size threshold that is needed to select an expanding method according to the dot size, an output dot size, and output device designation information (information for selecting the expanding process method (5)) that designates the dot pattern output device (printer 37 and CRT 38).

Figure 38:
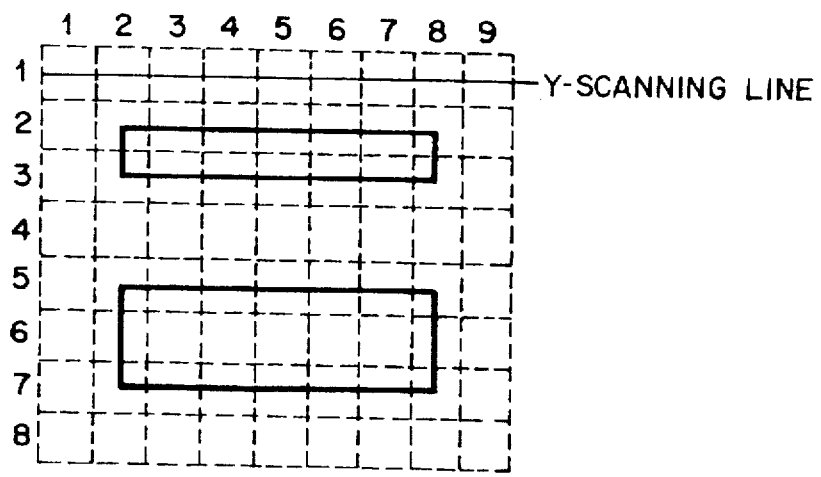
FIG. 38 is a diagram illustrating the coordinate system and the outline font used in the first expanding process according to the second embodiment.
Figure 39:
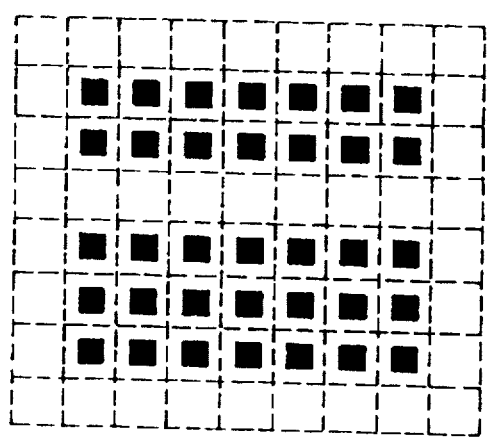
FIG. 39 is a diagram showing a dot pattern created by applying the first expanding process to the output line shown in FIG. 38.

Numeral 33 is a first filling unit (a first expanding unit). The first filling unit 33 realizes the first expanding process method (conventional expanding process technique) by defining the coordinate system of vector data on dots and subjecting an outline font created on dots to a filling process. When the first expanding process method 33 subjects an outline font shown in FIG. 38 of which the coordinate is defined on dots, to a filling process, the line width is increased by one dot, as shown in FIG. 39. In this case, an unidirectional scanning process (for example, only the Y-scanning operation) can be performed for a dot expansion.

Figure 40:
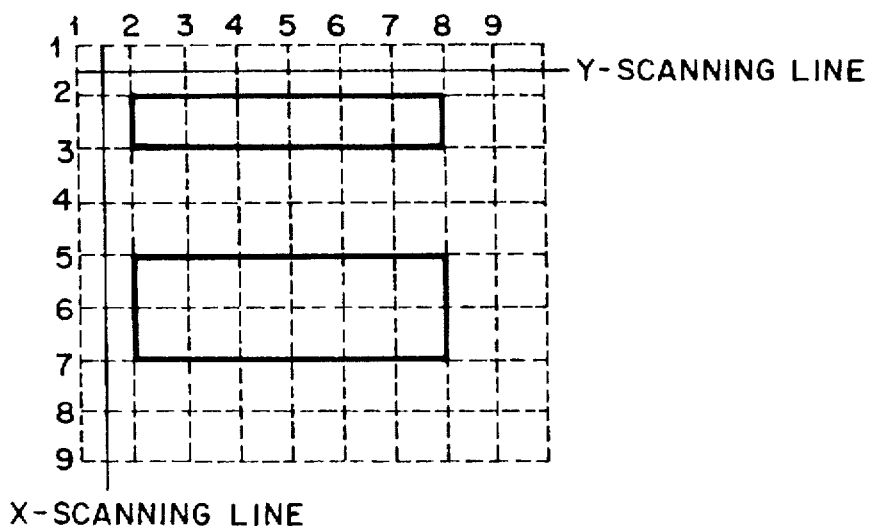
FIG. 40 is a diagram illustrating the coordinate system and the outline font used in the second expanding process according to the second embodiment.
Figure 41:
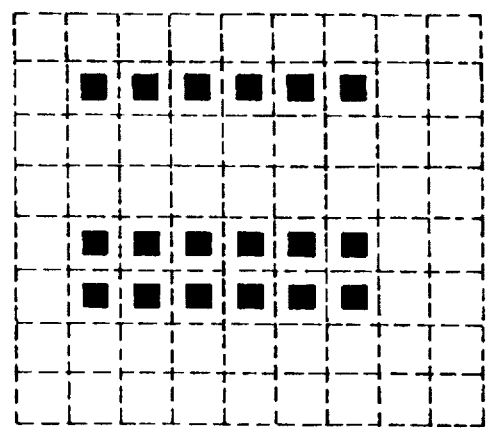
FIG. 41 is a diagram illustrating the dot pattern created by applying the second expanding process to the outline font shown in FIG. 40.
Figure 42:
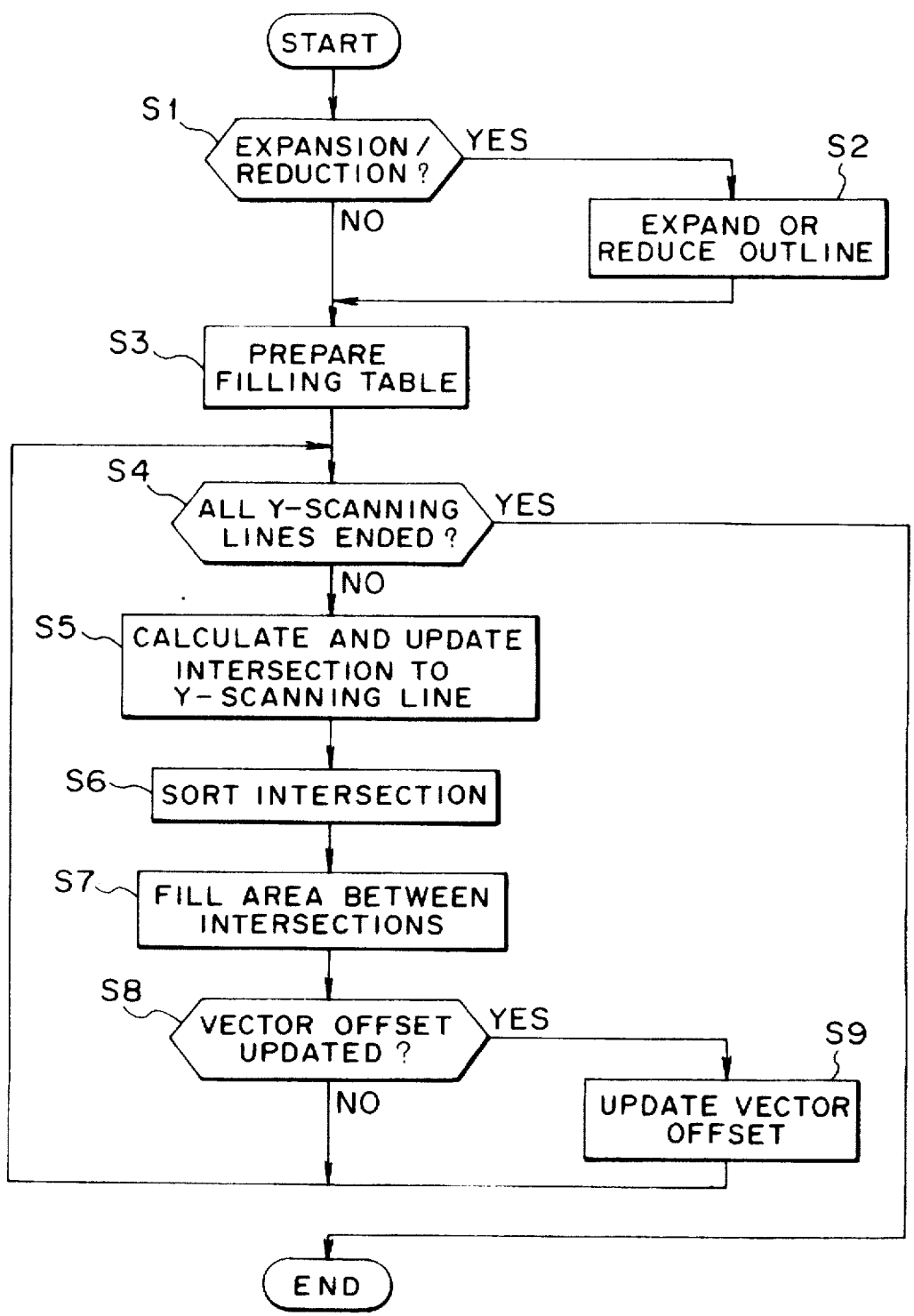
FIG. 42 is a flow chart for explaining a procedure of filling the inside of an outline font according to a conventional outline font expansion.
Figure 43:
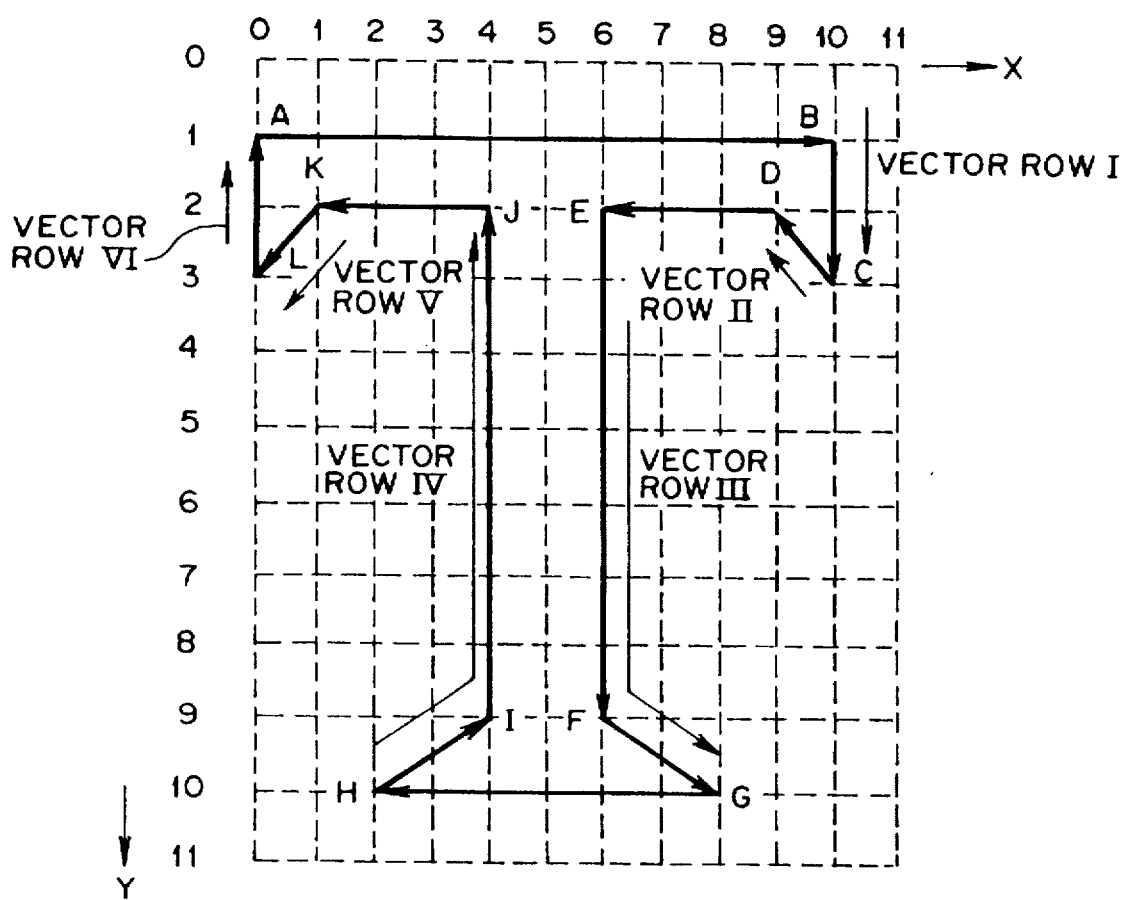
FIG. 43 is a diagram illustrating an outline font and Y-directional vector rows in a conventional coordinate system.
Figures 45, 46:
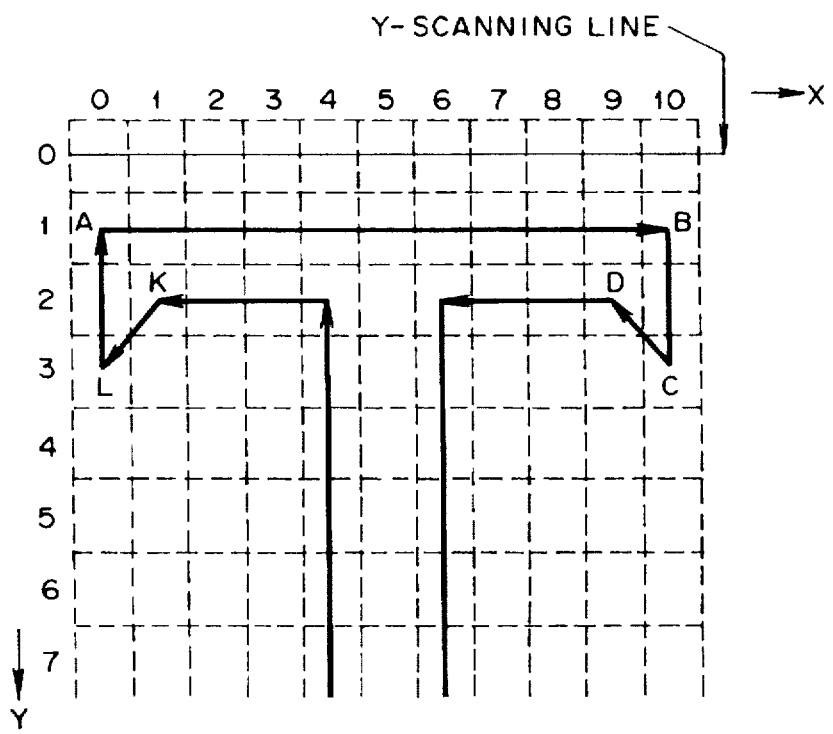
FIG. 45 is a diagram showing the initialization state of a conventional filling table.
FIG. 46 is a diagram showing the position of an actual Y-scanning line corresponding to the initialization state of the filling table shown in FIG. 45.
Figures 47, 48:
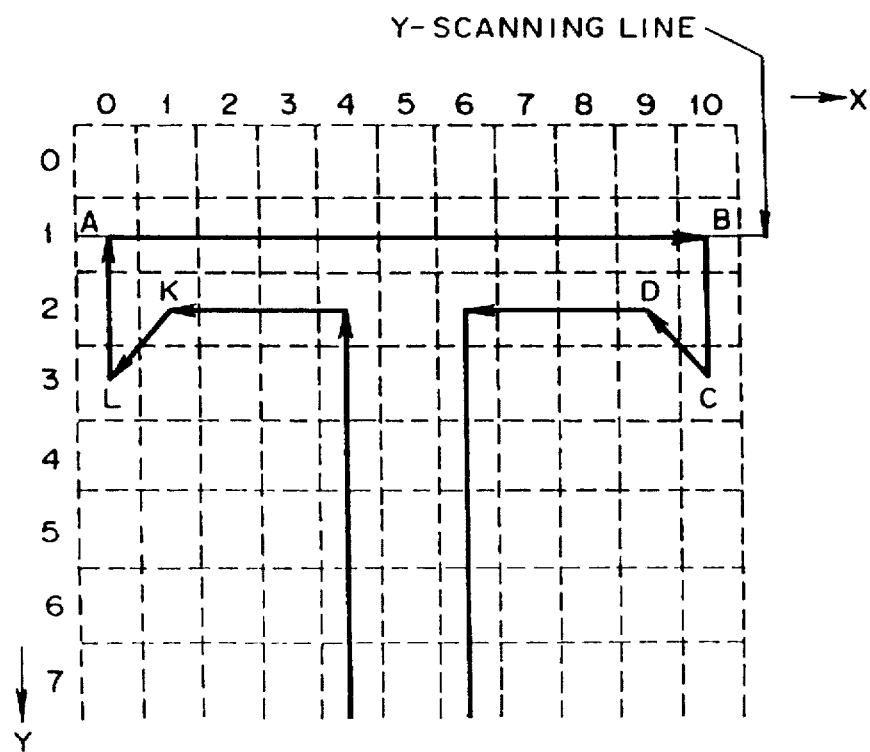
FIG. 47 is a diagram showing the setting state of the filling table where the conventional Y-scanning line intersects first the outline font.
FIG. 48 is a diagram showing the position of an actual Y-scanning line corresponding to the setting state of the filling table shown in FIG. 47.
Figure 49:
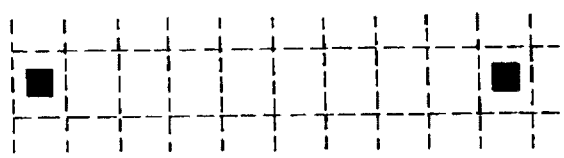
FIG. 49 is a diagram showing the intersections each of the Y-scanning line and the outline font, obtained in the state, shown in FIG. 47.
Figure 50:
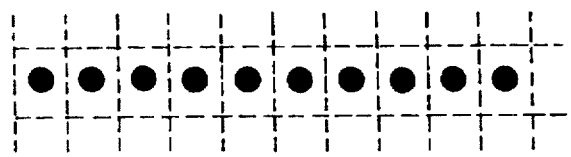
FIG. 50 is a diagram showing a dot pattern created by filling the intersections calculated as shown in FIG. 49.
Figures 51, 52:
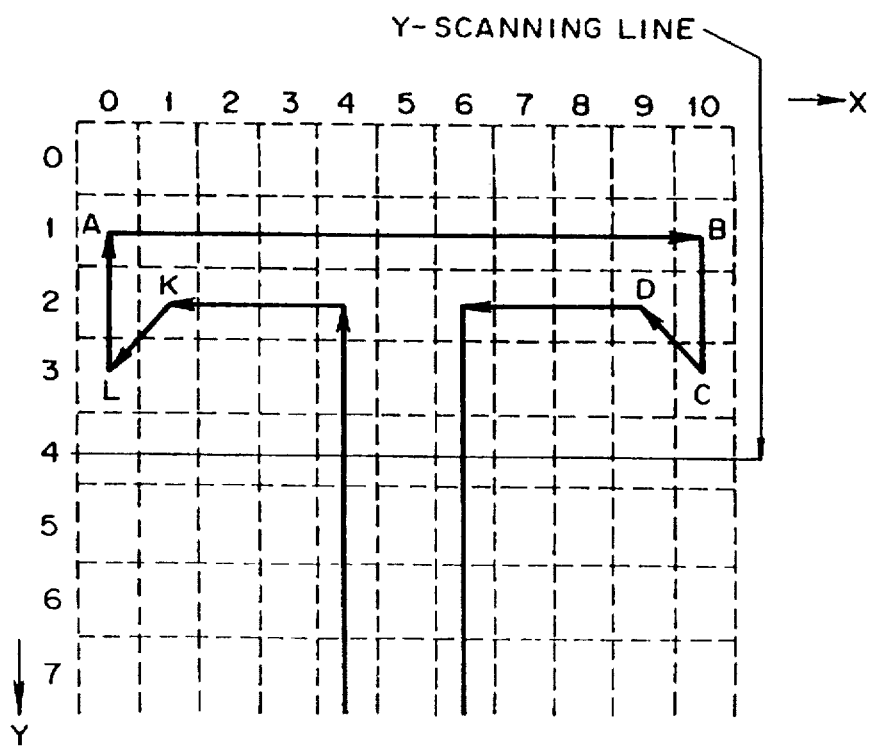
FIG. 51 is a diagram illustrating the setting state of a conventional filling table after the start vector offset has been updated.
FIG. 52 is a diagram showing the position of an actual Y-scanning line corresponding to the setting state of the filling table shown in FIG. 51.
Figure 54:
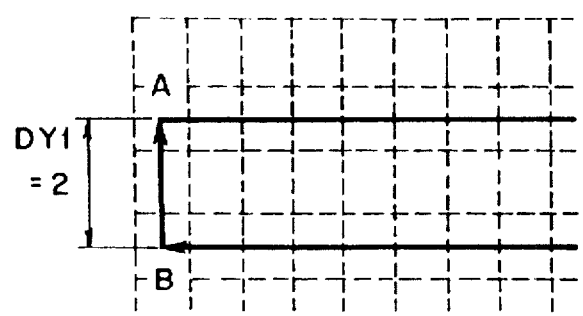
FIG. 54 is a diagram showing an outline font with a two-dot line width in the conventional coordinate system.
Figure 55:
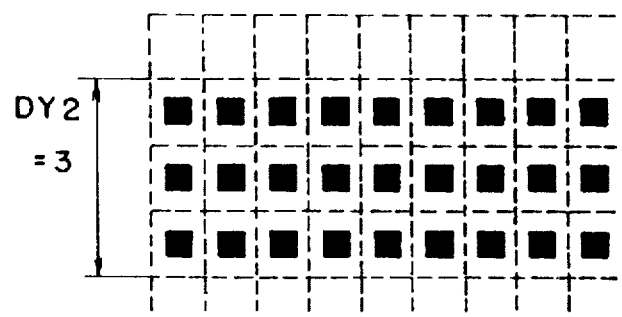
FIG. 55 is a diagram showing a dot pattern created by applying the conventional filling process to the outline font shown in FIG. 54.
Figure 56:
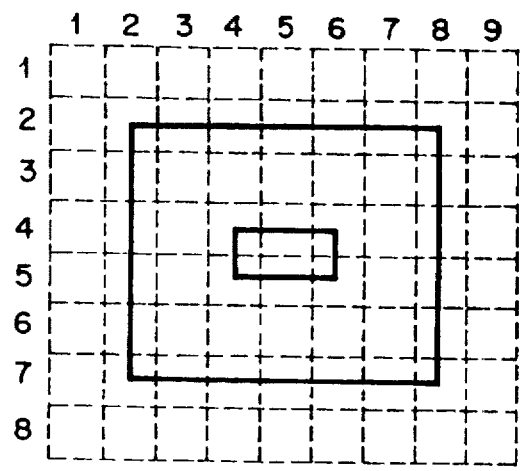
FIG. 56 is a diagram illustrating an outline font with the middle portion having a blank portion of one-dot width.

Numeral 34 represents a second filling unit (a second expanding unit). The second filling unit 34 realizes the second expanding method (or the expanding process technique described with the first embodiment) by subjecting an outline font to a filling process, the outline font being created on the dot boundaries in the vector data coordinate system defined between dots, to a filling process.

Where the coordinate of an outline font is defined on the dot boundaries and the filling process is performed as shown in FIG. 40, the second filling unit 34 can reproduce the original line width of an outline font a shown in FIG. 41. In order to complement the dropout portion, like the first embodiment, a bidirectional scanning process (the Y-scanning process and the X-scanning process) is needed.

In order to perform a filling process to an outline font, the process system switching and deciding unit (switching unit) 35 adopts any one of the five switching methods according to switching method designation information and output device designation information input from the information input unit 32, decides whether the expanding process is performed by the first expanding method or the second expanding method, according to the selected switching method, and then selectively switches the selected expanding process to the first filling unit 33 or the second filling unit 34.

The output processing unit 36 outputs the dot pattern expanded under the filling process of the first filling unit 33 or the second filling unit 34 to the printer 37 or the CRT 38, or both.

The switching operation of the process method switching and deciding unit 35 will be described in detail with reference to FIGS. 34 to 37. Where the switching method (1) is designated by the switching method designation information and the output dot size is more than the dot size threshold or the dot size threshold or more, the process method switching and deciding unit 35 is connected to the first filling unit 33. Where the output dot size is less than the threshold or the threshold or less, the process method switching and deciding unit 35 is connected to the second filling unit 34.

Where the switching method (2) is designated by the switching method designation information and the output dot size is more than the threshold or the threshold or more, the process method switching and deciding unit 35 is connected unconditionally to the first filling unit 33. When the output dot size is less than the dot size threshold or the dot size threshold or less, the process method switching and deciding unit 35 is connected to the filling process unit 33 or 34 according to the process method designation information preset every typeface.

Where the switching method (3) is designated by the switching method designation information and the output dot size is the dot size threshold or more or more than the dot size threshold, the process method switching and deciding unit 35 is connected unconditionally to the first filling unit 33. When the output dot size is less than the dot size threshold or the threshold or more, the process method switching and deciding unit 35 is connected to the filling process unit 33 or 34 according to the process method designation information preset every code table.

Where the switching method (4) is designated by the switching method designation information and the output dot size is the dot size threshold or more or more than the threshold, the process method switching and deciding unit 35 is connected unconditionally to the first filling unit 33. When the output dot size is less than the dot size threshold or the threshold or more, the process method switching and deciding unit 35 is connected to the filling process unit 33 or 34 according to the process method designation information preset every character.

Where the switching method (5) is designated by the switching method designation information and the output dot size is the dot size threshold or more than the dot size method, the process method switching and deciding unit 35 decides the output device (printer 37/CRT 38) according to the output device designation information. With the CRT 38 acting as an output device, the process system switching and deciding unit 35 selects unconditionally to the first filling process unit 33. With the printer 37 acting as an output device, when the output dot size is the dot size threshold or more or more than the threshold, the process method switching and deciding unit 35 selects unconditionally to the first filling process unit 33. When the output dot size is less than the threshold or the threshold or less, the second filling process unit 34 is selected.

The operation of the outline font expanding device according to the second embodiment will be described with reference to the flow chart shown in FIGS. 34 to 37.

The main routine of the second embodiment will be described with reference to the flow chart (the steps S31 to S38) shown in FIG. 34. First the information input unit 32 outputs the switching method designation information, the dot size threshold, output dot size, the output device designation information, and the like. The outline data file 31A outputs an outline font to be expanded (step S31). The outline data file 31B outputs an outline font to be expanded (step S31).

Figure 35:
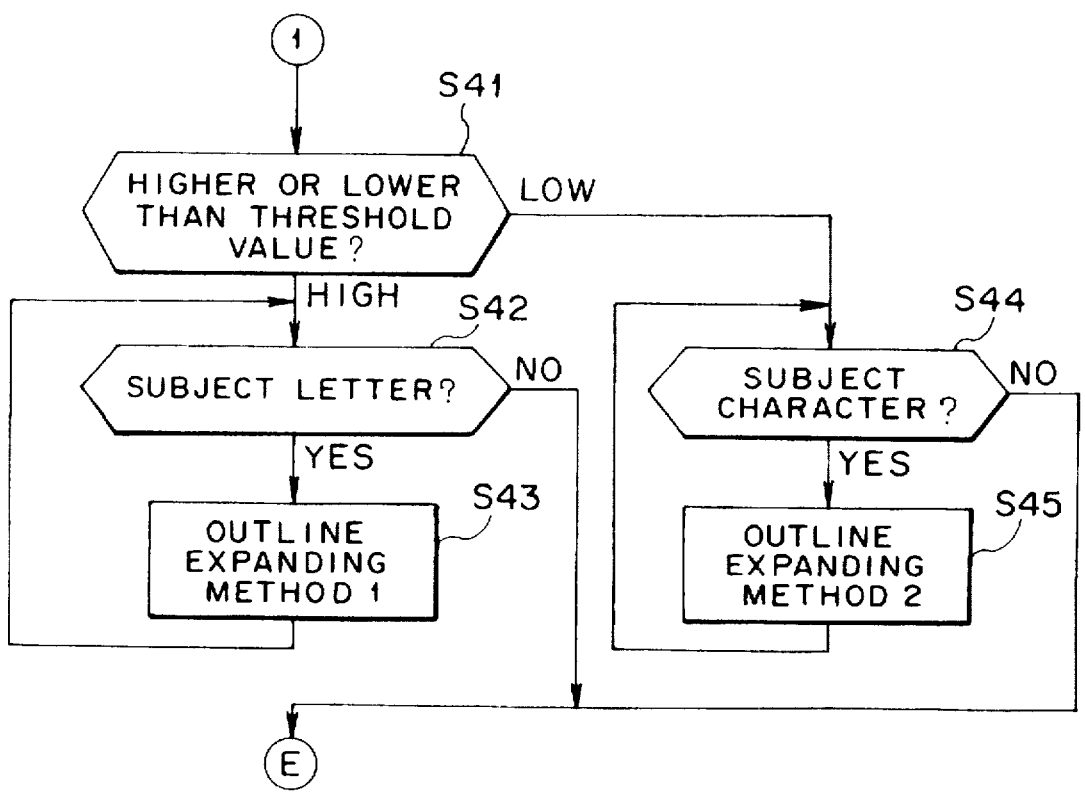
FIG. 35 is a flow chart used for explaining the operation of the second embodiment.
Figure 36:
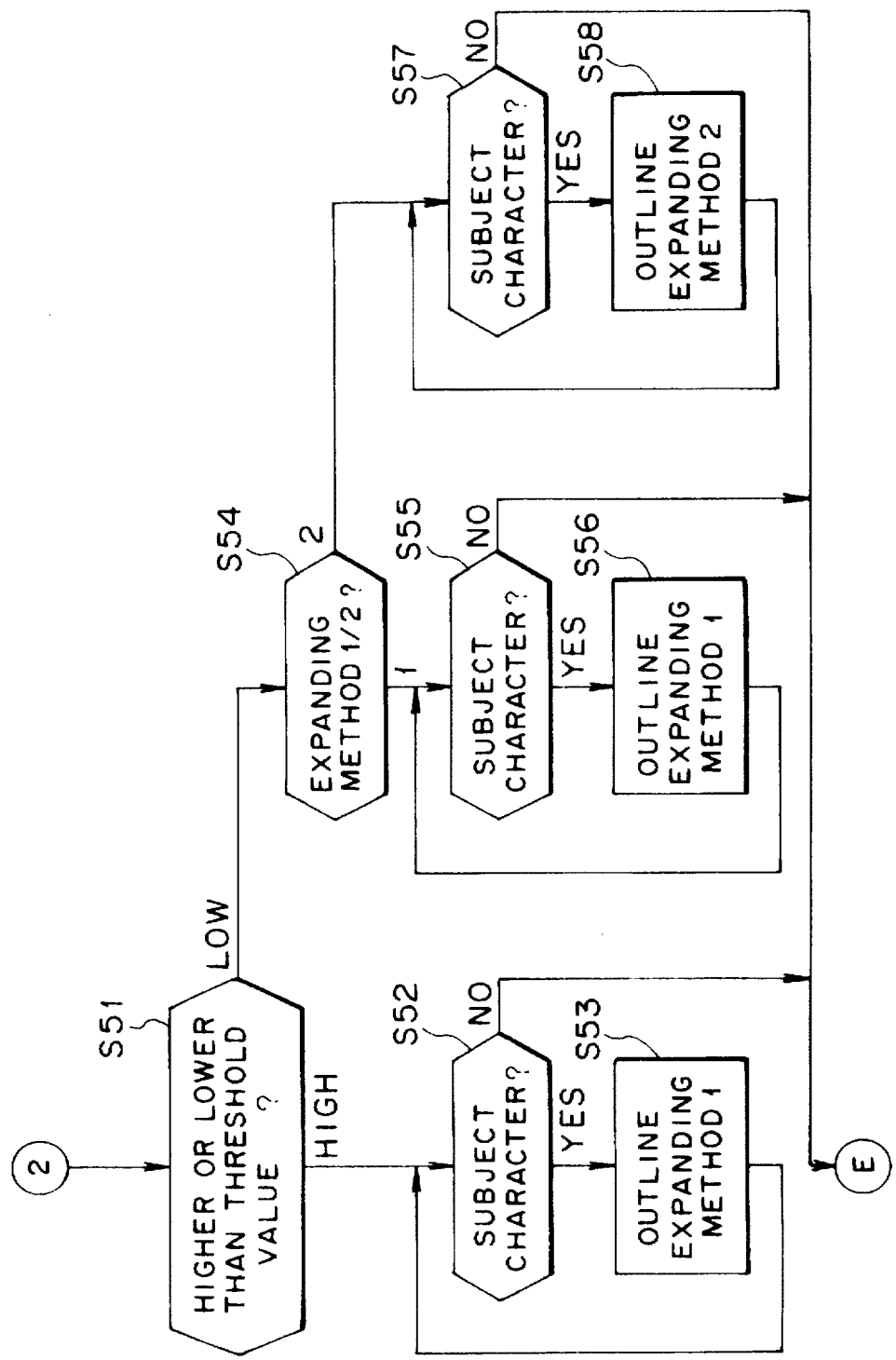
FIG. 36 is a flow chart used for explaining the operation of the second embodiment.
Figure 37:
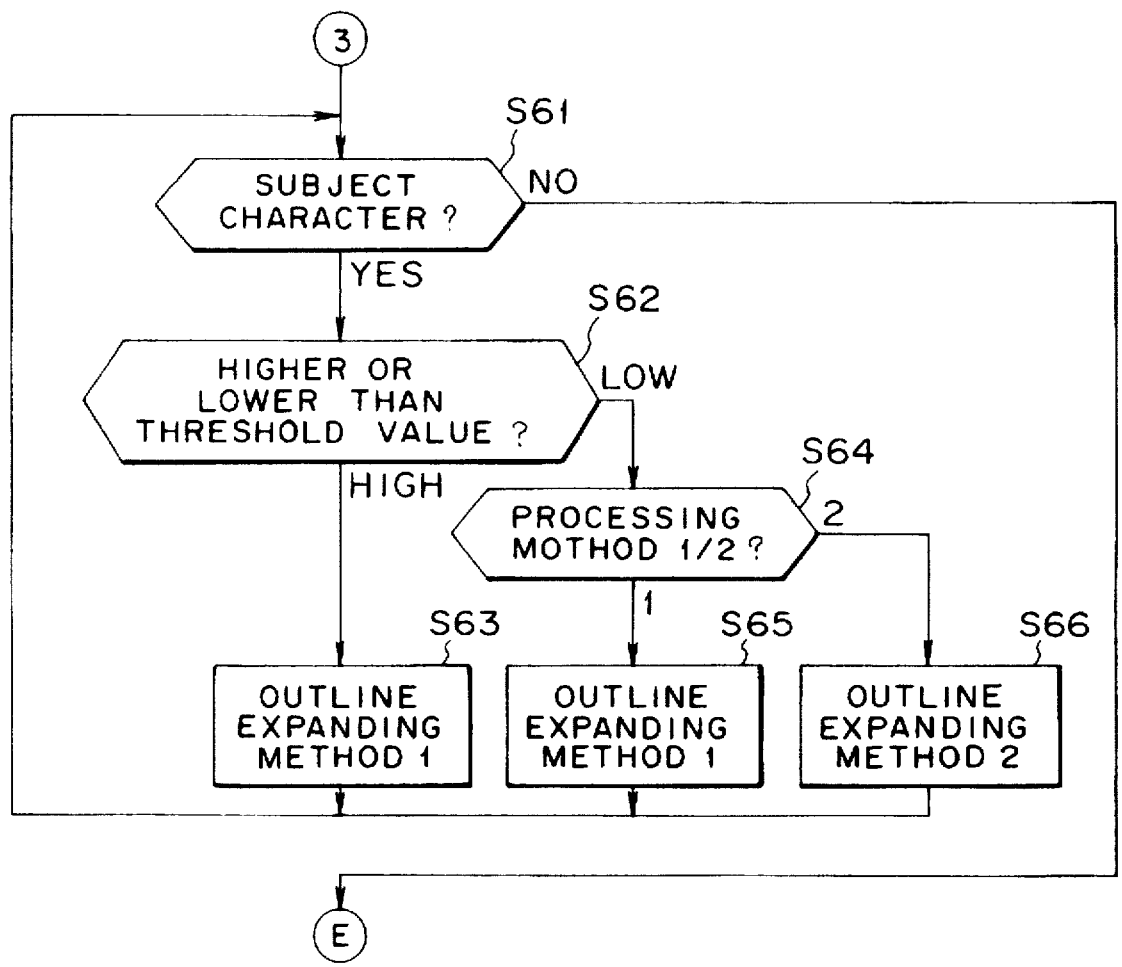
FIG. 37 is a flow chart used for explaining the operation of the second embodiment.

The process method switching and deciding unit 35 performs the steps S32 to S36, based on the switching method designation information and the output device designation information. In response to the decision result, the flow goes to the subroutine that selects an actual expanding system, as shown in FIG. 35 to 37.

In the step S32, it is decided whether the switching method designation information designates a selection of the output dot size (the switching in the item (1)). If the switching is designated (YES decision), the flow goes to the process operation shown in FIG. 35.

In the step S32, if it is decided that the switching method designation information has not designated the output dot size selection, it is decided whether the switching method designation information designates a typeface selection (the selection in the item (2)). In the case of the switching designation (YES decision), the flow goes to the process operation shown in FIG. 36.

If it is decided that the switching method designation information has not designated the typeface selection in the step S33 (NO decision), it is decided whether the same is a code table selection (the selection in the item (3). If the code table selection is designated (YES decision), the flow goes to the process operation shown in FIG. 37.

If the switching method designation information has not designated the code table selection in the step S34 (NO decision), it is decided whether the switching method designation information has designated the character selection in the step S35 (the selection in the item (4)). If the character selection is designated (YES decision), the flow goes to the process operation shown in FIG. 37, like the code table selection.

Figure 34:
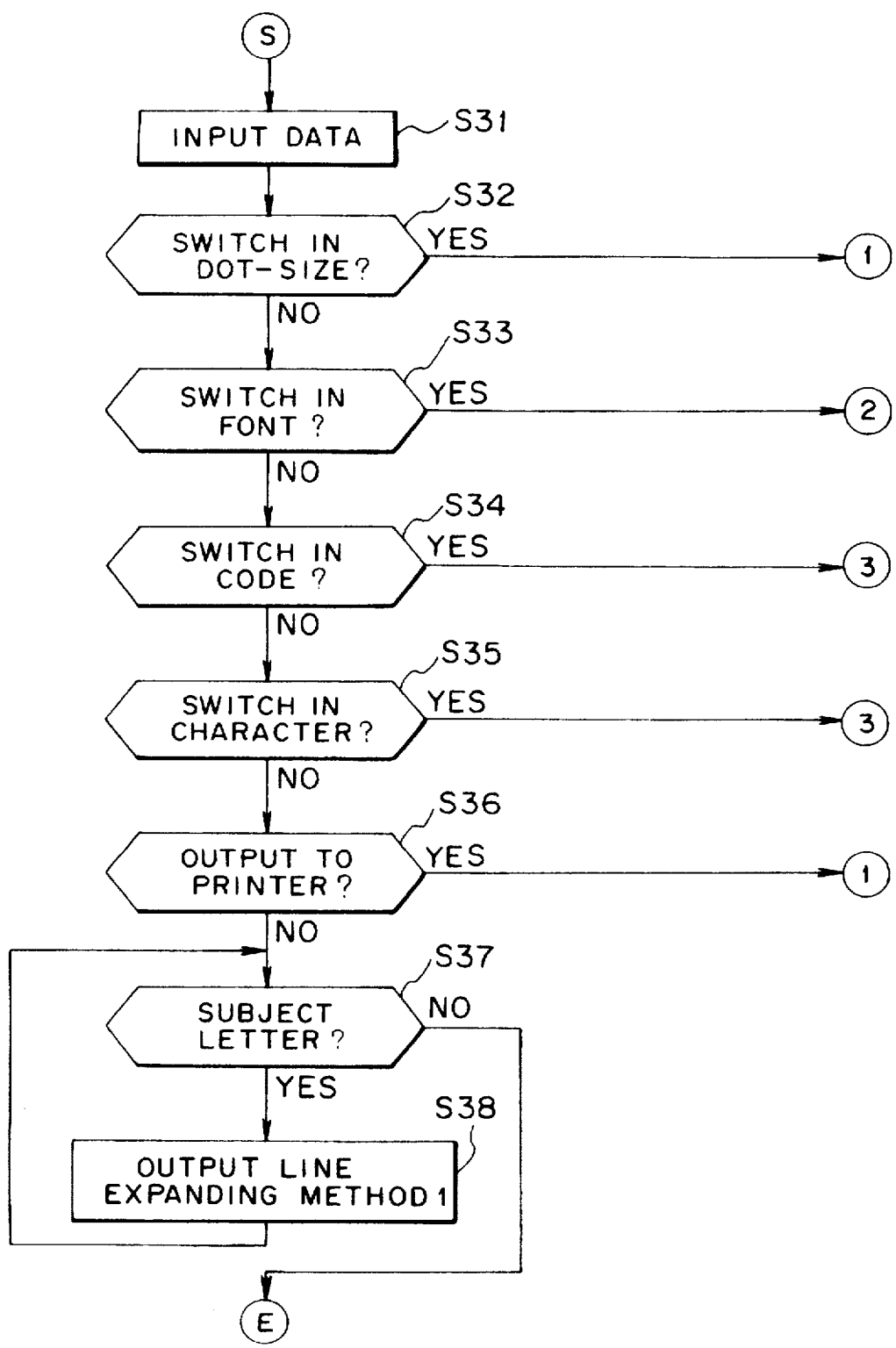
FIG. 34 is a flow chart used for explaining the operation of the second embodiment.

If it is decided that the switching method designation information has not been designated in the step S35 (NO decision), it is decided whether a dot pattern is output to the printer 37, based on the output device designation information in the step S36. Where a dot pattern is output to the printer 37 (YES decision), the flow goes to the process operation shown in FIG. 35, like the dot size switching operation.

Where it is decided that a dot pattern is not output to the printer 37 in the step S36 (NO decision), it is decided that a dot pattern is output only to the CRT 38 that attaches importance to the performance (processing speed) rather than the quality of a dot pattern. The first filling unit 33 repeats the outline font expanding method 1 till the characters to be expanded run out, in spite of the size of output dots. This procedure can prevent the output performance to the CRT 38 from being degraded.

Where it is decided that the switching method designation information designates a selection of the output dot size in the step S32 shown in FIG. 34, or that a dot pattern is output to the printer 37 in the step S36 in FIG. 34, the output dot size is compared with the dot size threshold, as shown in FIG. 35 (step S41).

Where the output dot size is the dot size or more or the threshold or more, the first filling unit 33 repeats the outline expanding method 1 (step S43) till the characters to be expanded run out (NO decision in the step S42). Where the output dot size is less than the dot size threshold or the dot size threshold or less, the second filling unit 34 repeats the outline expanding system 2 (step S45) till the characters to be expanded run out (NO decision in the step S44).

With a dot pattern of a low dot density that affects largely an increase in the line width per dot in the first expanding process method 1, the second expanding process method that can reproduce faithfully the original line width of an outline font is selected, thus improving largely the quality of the dot pattern. With a dot pattern of high dot density that little affects an increase in the line width of a dot, the first expanding process system that has a processing speed faster than the second expanding process system is selected, thus preventing certainly a decrease in a dot expanding performance.

Where it is decided that the switching method designation information designates a typeface selection in the step S33 shown in FIG. 34, the output dot size is first compared with the dot size threshold set every typeface, as shown in FIG. 36 (step S51).

Where the output dot size is the dot size threshold or more or more than the dot size threshold, the first filling unit 33 repeats the outline font expanding system 1 (step S53) till the characters to be expanded are exhausted (NO decision in the step S52).

Where the output dot size is less than the dot size threshold or the dot size threshold or more, it is decided whether the process method designation information to be preset every typeface designates the first expanding process method or the second expanding process method (step S54).

Whether the first expanding process method is designated, the first filling unit 33 repeats the outline expanding method 1 (step S56).(step S56) till the characters to be expanded are used up (NO decision in the step S55). Where the second expanding process method is designated, the second filling unit 34 repeats the outline expanding method 2 (step S58) till the characters to be expanded are used up (NO decision in the step S57).

As described above, the second expanding process method selected by the process method designation information can reproduce faithfully the original line width of an outline font of a thick letter such as Gothic character, thus largely improving the quality of a dot pattern. The first expanding process method which is designated by the process method designation information can reproduce a relatively thin letter such as Ming character, thus preventing certainly a decrease in the performance of a dot expanding process.

Where it is decided that the switching method designation information designates the code table selection in the step S34 shown in FIG. 34, or that the switching method designation information designates a character selection in the step S35 shown in FIG. 34, it is decided whether a character is to be expanded, as shown in FIG. 37 (step S61). If the character is not to be expanded (NO decision), the process is ended. If YES decision, the output dot size is compared with the dot size threshold set every code table or every character (step S62).

Where the output dot size is the dot size threshold or more or more than the threshold, the first filling unit 33 performs the outline expanding system 1 (step S63).

Where the output dot size is less than the dot size threshold or the threshold or less, it is decided whether the process method designation information preset every code table or every character designates the first expanding process method or the second expanding process method (step S64). Where the first expanding process method is designated, the first filling unit 33 performs the outline expanding method 1 (step S65). Where the second expanding process method is designated, the second filling unit 34 performs the outline expanding method 2 (step S66).

The second expanding process method designated by the process method designation information can reproduce faithfully the original line width of an outline font of a Chinese character with many strokes or of the code table for characters with many strokes such as Chinese characters. Thus the quality of a dot pattern can be improved largely. As to a code table for letters such as symbols or alphanumeric letters with a small number of strokes and characters with a small number of strokes, a decrease in the dot expanding process performance can be certainly prevented by designating the first expanding process method by the process method designation information.

The case where five switching methods (1) to (5) are selectively designated and performed according to switching method designation information has been described in the second embodiment. However, the present invention should not be limited to the above embodiment. At least one of the five switching methods or other switching methods may be adopted.

What is claimed is:

1. An outline font expanding method which includes the steps of drawing sequentially a contour line to form an outline font, based on vector data, and then filling the inside of the outline font to form a dot pattern, comprising the steps of:

defining a coordinate system of said vector data on boundaries between dots and then creating the outline font on said boundaries;

calculating the number of dots as a unit change moved in a main scanning direction when the outline font is moved by one dot in a secondary scanning direction;

adding a value obtained by dividing said unit change by 2 to the coordinate in the main scanning direction of the outline font;

moving a scanning line dot by dot in said main scanning direction while obtaining an intersection of said scanning line and the outline font at each moved to position; and obtaining a filling range on the scanning line in the main scanning direction.

2. The outline font expanding method according to claim 1, further comprising the steps of:

moving said scanning line in the secondary scanning direction to obtain the filling range at all positions in the secondary scanning direction;

then interchanging the main scanning direction and the secondary scanning direction;

calculating the number of dots as a unit change moved in the new main scanning direction when the outline font is moved by one dot in the new secondary scanning direction;

adding a value obtained by dividing the unit change by 2 to the coordinate of the outline font in the new main scanning direction;

moving said main scanning line in the new main scanning direction dot by dot in the new secondary scanning direction while the intersection of said scanning line and the outline font is obtained at each moved to position; and finding a portion to be filled which is dropped out in said filling range to complement and correct said filling range.

3. An outline font expanding device that draws sequentially a contour line to form an outline font, based on vector data, and then fills the inside of the outline font to form a dot pattern, comprising:

an outline data storing unit for defining a coordinate system of said vector data on boundaries between dots and then storing the vector data of the outline font created on said boundaries;

a filling table storing unit for storing a filling table used for obtaining a range to be filled in the inside of the outline font;

a filling table preparing unit for preparing said filling table, by dividing the outline font into vector rows chained in a secondary scanning direction, based on the vector data of the outline font stored in said outline data storing unit, by setting information regarding a scanning start position and information regarding a scanning end position, following sequentially in the secondary scanning direction of each vector row, in the filling table, by setting the coordinate in a main scanning direction of the scanning start position information, as an initial value of information regarding a current intersection to a scanning line in the main scanning direction, of each vector row, in the filling table, by calculating and setting the number of dots as a unit change moved in the main scanning direction in the filling table when the outline font is moved by one dot in the secondary direction of each vector row, and by further adding a value obtained by dividing the unit change by 2 to the initial value of the current information of each vector row;

a filling unit for obtaining the current intersection information which intersects a scanning line in the main scanning direction moved dot by dot in the secondary direction, as an intersection of the scanning line and the outline font, with reference to the filling table stored in said filling table storing unit, to obtain the filling range along the scanning line in the main scanning direction, then for applying a filling process to the filling range, for adding the unit change to the current intersection information of the vector row intersecting the scanning line to update the filling table, and for moving the scanning line dot by dot in the secondary scanning direction; and a dot data storing unit for storing the dot pattern which is prepared by filling the outline font to each scanning line by the filling unit.

4. The outline font expanding device according to claim 3, further comprising:

a correction table storing unit for storing a correction table used to correct the filling range within the outline font after the filling unit has completed the filling process;

a correction table preparing unit for preparing the correction table by interchanging the main scanning direction and the secondary scanning direction, by dividing the outline font into vector rows chained in the new secondary scanning direction, based on vector data of the outline font stored in the outline data storing unit, by setting information regarding a scanning start position and information regarding a scanning end position, following sequentially in the new secondary scanning direction, in the correction table to each vector row, by setting the coordinate in the new main scanning direction of the scanning start position information, as an initial value of the current information to the scanning line in the new main scanning direction, in the correction table to each vector row, by calculating the number of dots as a unit change moved in the new main scanning direction when the outline font is moved by one dot in the new secondary scanning direction to each vector row and then setting the resultant in the correction table, and by adding a value obtained by dividing the unit change by 2 to the initial value of the current intersection information; and a correcting unit for complimenting and writing the dot pattern stored in the dot data storing unit by obtaining the current intersection information of each vector row intersecting the scanning line in the new main scanning direction moved dot by dot in the new secondary direction, as an intersection of the scanning line and the outline font, with reference to the correction table in said correction table storing unit, by obtaining a filling range in the new main scanning direction on the scanning line, and by filling the filling range when the filling range is less than one dot, for adding the unit change to the current intersection information of the vector row intersecting the scanning line to update the correction table, and for moving the scanning line dot by dot in the new secondary scanning direction.

5. An outline font expanding method that includes the steps of drawing sequentially a contour line to form an outline font and then filling the inside of the outline font to form a dot pattern, based on vector data, comprising the steps of:

interchanging selectively a first expanding process and a second expanding process, with information regarding the outline font to be subjected to a filling process, the first expanding process defining a coordinate of the vector data, based on a dot and applying the filling process to the outline font created on the dots, the second expanding process defining the coordinate of the vector data on boundaries between the dots and applying the filling process to the outline font; and applying the filling process to the outline font.

6. The outline font expanding method according to claim 5, wherein the information of the outline font to be filled has a dot size used for the dot pattern to be created; and further comprising the step of selecting said first expanding process when said dot size is at least a predetermined threshold, or more than the predetermined threshold, or of selecting said second expanding process when said dot size is less than the predetermined threshold, or not greater than said predetermined threshold.

7. The outline font expanding method according to claim 5, wherein the information of the outline font to be filled is a typeface of the outline font; and further comprising the step of selecting said first expanding process or said second expanding process, according to a typeface of the outline font.

8. The outline font expanding method according to claim 7, further comprising the steps of:

predetermining designating information that designates either said first expanding process or said second expanding process as well as the dot size threshold, according to the typeface; and selecting said first expanding process when a dot size of the dot pattern to be created is at least the threshold, or more than the threshold, or selecting said second expanding process according to the designating information when the dot size of the dot pattern to be created is less than the threshold or not greater than the threshold.

9. The outline font expanding method according to claim 5, wherein information regarding the outline font to be filled is within a code range of the outline font, and further comprising the steps of selecting said first expanding process or said second expanding process, according to the code range of the outline font.

10. The outline font expanding method according to claim 9, further comprising the steps:
presetting the threshold of a dot size of the dot pattern as well as designation information designating either said first expanding process or said second expanding process, according to the code range;
selecting said first expanding process when the dot size of the dot pattern to be created is at least the threshold, or more than the threshold; and
interchanging said first expanding process and said second expanding process, according to the designation information when the dot size of the dot pattern to be created is less than the threshold or not greater than the threshold.

11. The outline font expanding method according to claim 5, wherein information regarding the outline font to be filled is the outline font itself; and further comprising the step of selecting said first expanding process or said second expanding process every outline font.

12. The outline font expanding method according to claim 11, further comprising the steps:
presetting a dot size of the dot pattern as well as designation information designating either said first expanding process or said second expanding process every character;
selecting said first expanding process when the dot size of the dot pattern to be created is at least the threshold or more than the threshold, and
interchanging said first expanding process and said second expanding process, according to the designation information, when the dot size of the dot pattern to be created is less than the threshold or not greater than the threshold.

13. The outline font expanding method according to claim 5, wherein information regarding the outline font to be filled relates to an output unit that outputs an expansion result of the outline font; and further comprising the step of interchanging said first expanding process and said second expanding process based on the expansion result.

14. An outline font expanding device which draws sequentially a contour line to form an outline font and then fills the inside of the outline font to form a dot pattern, based on vector data, comprising:
a first expanding unit that defines a coordinate of the vector data on dots and applies a filling process to the outline font created on the dots;
a secondary expanding unit that defines the coordinate of the vector data on the boundaries between dots and applies a filling process to the outline font; and
a switching unit for selecting said first expanding unit or said second expanding unit, according to information regarding the outline font to be subjected to a filling process, to apply the filling process to the outline font.

15. The outline font expanding device according to claim 14, wherein information regarding the outline font to be filled corresponds to a dot size of the dot pattern to be created; and wherein said switching unit selects said first expanding unit when the dot size is at least a predetermined threshold or more than the predetermined threshold and selects said second expanding unit when the dot size is less than the predetermined threshold or not greater than the predetermined threshold.

16. The outline font expanding device according to claim 14, wherein the information of the outline font to be filled corresponds to a typeface of the outline font; and wherein said switching unit selects said first expanding unit or said second expanding unit, according to the typeface of the outline font.

17. The outline font expanding device according to claim 16, wherein the dot size threshold as well as designation information that designates either said first expanding unit or said second expanding unit are predetermined according to the typeface; and wherein said switching unit selects said first expanding unit when the dot size of the dot pattern to be created is at least the predetermined threshold or more than the predetermined threshold, or selects the second expanding unit according to the designation information when the dot size of the dot pattern to be created is less than the predetermined threshold or not greater than the threshold.

18. The outline font expanding device according to claim 14, wherein the information of the outline font to be filled corresponds to a typeface of the outline font; and wherein said switching unit selects said first expanding unit or said second expanding unit, according to a code range of the outline font.

19. The outline font expanding device according to claim 18, wherein designation information that designates the dot size threshold as well as either said first expanding process or said second expanding process are predetermined according to the code range; and wherein said switching unit selects said first expanding unit when the dot size of the dot pattern to be created is more than the threshold or at least as great as the threshold, or selects said second expanding unit according to the designating information when the dot size of the dot pattern to be created is less than the threshold or not greater than the threshold.

20. The outline font expanding device according to claim 14, wherein the information regarding the outline font to be filled is the outline font itself; and wherein said switching unit selects said first expanding unit or said second expanding unit every outline font.

21. The outline font expanding device according to claim 20, wherein the dot size threshold as well as designation information designating either said first expanding unit or said second expanding unit are preset every character; and wherein said switching unit selects said first expanding unit when the dot size of a dot pattern to be created is more than the threshold or at least as great as the threshold, or selects said first expanding unit or said second expanding unit, according to the designation information, when the dot size of the dot pattern to be created is less than the threshold or not greater than the threshold.

22. The outline font expanding unit according to claim 14, wherein the information regarding the outline font to be filled relates to an output unit that outputs the expansion result of the outline font; and wherein said switching unit selects said first expanding unit or said second expanding unit based upon the expansion result.

* * * * *

UNITED STATES PATENT AND TRADEMARK OFFICE
CERTIFICATE OF CORRECTION

PATENT NO. : 5,754,164
DATED : May 19, 1998
INVENTOR(S) : Yutani et al.

It is certified that error appears in the above-identified patent and that said Letters Patent is hereby corrected as shown below:

Title page, [56] References Cited, add the following reference
-- 6-12049  01/21/94  Japan --

[57] Substitute the following new Abstract:

--An outline font expanding method and an outline font expanding device each of which can reproduce faithfully the line width of an original outline font. The coordinate system for vector data is defined on the boundaries between dots to create an outline font on the boundaries. The number of dots in the main scanning direction is calculated as a unit change when the outline font is moved by one dot in a secondary scanning direction. A value obtained by dividing the unit change by 2 is added to the coordinate in a main scanning direction of the outline font. While the scanning line is moved dot by dot in the main scanning direction, the intersection of the scanning line and the outline font is obtained at each moved to position. Thus, the filling range over the scanning line is defined in the main scanning direction. The method fills the inside of the outline font drawn, based on vector data, and then forms a dot pattern of a character, symbol, graph, or the like.--

Signed and Sealed this

Twenty-second Day of September, 1998

*Attest:*

BRUCE LEHMAN

*Attesting Officer*  *Commissioner of Patents and Trademarks*